US008368672B2

(12) United States Patent
Morita

(10) Patent No.: US 8,368,672 B2
(45) Date of Patent: Feb. 5, 2013

(54) SOURCE DRIVER, ELECTRO-OPTICAL DEVICE, AND ELECTRONIC INSTRUMENT

(75) Inventor: Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1076 days.

(21) Appl. No.: 11/984,077

(22) Filed: Nov. 13, 2007

(65) Prior Publication Data

US 2008/0117235 A1 May 22, 2008

(30) Foreign Application Priority Data

Nov. 16, 2006 (JP) ................................ 2006-309917

(51) Int. Cl.
*G06F 3/038* (2006.01)

(52) U.S. Cl. ....................................... 345/204; 345/100

(58) Field of Classification Search .................... 345/98, 345/100, 206, 103
See application file for complete search history.

(56) References Cited

U.S. PATENT DOCUMENTS

| | | | | |
|---|---|---|---|---|
| 5,555,001 | A * | 9/1996 | Lee et al. | 345/93 |
| 6,642,916 | B1 | 11/2003 | Kodama et al. | |
| 6,847,344 | B2 * | 1/2005 | Ha | 345/95 |
| 6,954,192 | B2 * | 10/2005 | Kim | 345/87 |
| 7,050,028 | B2 | 5/2006 | Morita | |
| 7,068,292 | B2 | 6/2006 | Morita | |
| 7,071,669 | B2 | 7/2006 | Morita | |
| 7,079,127 | B2 | 7/2006 | Morita | |
| 7,106,321 | B2 | 9/2006 | Morita | |
| 7,117,042 | B2 | 10/2006 | Morita | |
| 7,218,309 | B2 * | 5/2007 | Uchino et al. | 345/103 |
| 7,289,095 | B2 * | 10/2007 | Park et al. | 345/98 |
| 7,304,632 | B2 | 12/2007 | Kodama et al. | |
| 2001/0040545 | A1 | 11/2001 | Mishima et al. | |
| 2004/0257351 | A1 * | 12/2004 | Ishii | 345/204 |
| 2005/0207249 | A1 * | 9/2005 | Morita | 365/203 |
| 2006/0050065 | A1 | 3/2006 | Maki | |
| 2006/0077491 | A1 | 4/2006 | Morita | |
| 2006/0158413 | A1 * | 7/2006 | Morita | 345/94 |
| 2006/0181494 | A1 | 8/2006 | Morita | |
| 2006/0181544 | A1 | 8/2006 | Morita | |
| 2006/0197734 | A1 | 9/2006 | Morita | |
| 2006/0198009 | A1 | 9/2006 | Morita | |
| 2008/0007499 | A1 * | 1/2008 | Kawabe | 345/82 |

FOREIGN PATENT DOCUMENTS

| | | |
|---|---|---|
| JP | A 10-11032 | 1/1998 |
| JP | A-10-239655 | 9/1998 |
| JP | A-11-30975 | 2/1999 |
| JP | A-2001-324962 | 11/2001 |

(Continued)

*Primary Examiner* — Chanh Nguyen
*Assistant Examiner* — Roy Rabindranath
(74) *Attorney, Agent, or Firm* — Oliff & Berridge, PLC

(57) ABSTRACT

A source driver that drives source lines of an LCD panel includes a first driver block including first to pth source output blocks arranged along a first direction, each of the source output blocks including a first output circuit that drives a source line, a second driver block including (p+1)th to qth source output blocks arranged along the first direction, each of the source output blocks including a second output circuit that drives a source line, and a precharge line that supplies a precharge voltage for precharging each of a first output of the first output circuit and a second output of the second output circuit. The precharge voltage is supplied to a voltage supply point of the precharge line provided so that a load from the voltage supply point to an edge of the pth source output block is equal to a load from the voltage supply point to an edge of the (p+1)th source output block.

22 Claims, 15 Drawing Sheets

FOREIGN PATENT DOCUMENTS

| | | |
|---|---|---|
| JP | A 2003-233354 | 8/2003 |
| JP | A 2003-233355 | 8/2003 |
| JP | A 2003-233356 | 8/2003 |
| JP | A 2003-233357 | 8/2003 |
| JP | A 2003-241717 | 8/2003 |
| JP | A 2005-31700 | 2/2005 |
| JP | A 2005-38346 | 2/2005 |
| JP | A 2005-122214 | 5/2005 |
| JP | A 2005-266346 | 9/2005 |
| JP | A-2006-78556 | 3/2006 |
| JP | A 2006-106574 | 4/2006 |
| JP | A 2006-227271 | 8/2006 |
| JP | A 2006-227272 | 8/2006 |
| JP | A 2006-243231 | 9/2006 |
| JP | A 2006-243232 | 9/2006 |
| JP | A 2006-243233 | 9/2006 |

* cited by examiner

SOURCE DRIVER, ELECTRO-OPTICAL DEVICE, AND ELECTRONIC INSTRUMENT

Japanese Patent Application No. 2006-309917 filed on Nov. 16, 2006, is hereby incorporated by reference in its entirety.

BACKGROUND OF THE INVENTION

The present invention relates to a source driver, an electro-optical device, and an electronic instrument.

In an active matrix type liquid crystal display (LCD) panel (electro-optical device in a broad sense) or the like, source lines may be driven by a multiplex drive. When forming a demultiplexer on an LCD panel, a source driver which drives source lines multiplexes grayscale voltages corresponding to grayscale data of dots forming one pixel by time division, and supplies the multiplexed grayscale voltage to the LCD panel. The demultiplexer separates the multiplexed grayscale voltage into the grayscale voltages corresponding to the source lines. In this case, the number of source outputs of the source drivers can be reduced.

When a demultiplexer is not formed on an LCD panel, a source driver is configured to include a demultiplexer. In this case, the circuit of the source driver can be used in common for the time-division multiplexed dots, whereby the circuit scale can be reduced.

Precharge technology is known which increases the liquid crystal drive speed of such an LCD panel. According to this precharge technology, a source line is precharged to a specific potential before driving the source line based on grayscale data, thereby reducing the amount of charging/discharging of the source line along with supplying a drive voltage based on the grayscale data.

This precharge technology is disclosed in JP-A-10-11032, for example. In JP-A-10-11032, different direct-current potentials are provided in advance, and a switch is provided between each direct-current potential and a source line. A connection between the direct-current potential and the source line is controlled by controlling the switch corresponding to the polarity of liquid crystal inversion drive. According to this precharge technology, the amount of charging/discharging of the source line along with driving can be reduced, even if the precharge cycle is reduced, whereby the liquid crystal drive time can be reduced while suppressing an increase in power consumption.

The precharge technology disclosed in JP-A-10-11032 changes the potential of the source line before the drive period in order to reduce the drive period. Therefore, the precharge voltage need not have a high accuracy.

In recent years, the resolution and the number of grayscales of an LCD panel have increased remarkably. Therefore, when the effective values of the voltages written into pixel electrodes differ, the difference in grayscale display between pixels can be clearly identified. The effective value corresponds to the integral value of the voltage applied to the pixel electrode in one horizontal scan period, for example. Therefore, even if pixels are connected with source lines to which an identical grayscale voltage is supplied, the difference in grayscale display can be identified when the precharge voltages differ, whereby the image quality deteriorates. In particular, since the grayscale characteristics cannot be changed in units of multiplexed pixels when using a multiplex drive in which the source lines are driven using the grayscale data of two or more pixels, the image quality deteriorates to a large extent due to the difference in precharge voltage.

A source driver which drives the source lines of such an LCD panel is divided into two source driver blocks from the viewpoint of layout efficiency, for example. The source lines in the left display area of the LCD panel and the source lines in the right display area of the LCD panel are driven by the respective source driver blocks. Therefore, when the precharge voltage differs between the two source driver blocks, the boundary between the left display area and the right display area of the LCD panel is identified, even when displaying an identical grayscale value.

Since the above problem is caused by the effective value of the voltage applied to the pixel, the above problem is applied not only to a source driver which multiplex-drives the LCD panel, but also to a source driver which does not multiplex-drive the LCD panel. Therefore, it is desirable that the source driver which precharges the source lines before driving the source lines be able to set the precharge voltage with high accuracy.

SUMMARY

According to one aspect of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to qth source output blocks including a second output circuit that drives at least one source line of the plurality of source lines; and a precharge line that supplies a precharge voltage for precharging each of a first output of the first output circuit and a second output of the second output circuit;

the precharge voltage being supplied to a voltage supply point of the precharge line provided so that a load from the voltage supply point to an edge of the pth source output block is equal to a load from the voltage supply point to an edge of the (p+1)th source output block.

According to another aspect of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to qth source output blocks including a second output circuit that drives at least one source line of the plurality of source lines; and a voltage supply line that supplies a given voltage to each of a first output of the first output circuit and a second output of the second output circuit;

the given voltage being supplied to a voltage supply point of the voltage supply line provided so that a load from the voltage supply point to an edge of the pth source output block is equal to a load from the voltage supply point to an edge of the (p+1)th source output block; and after the given voltage has been supplied to the plurality of source lines, each of the first and second output circuits driving the plurality of source lines by time division based on multiplexed grayscale data in which grayscale data of each dot of pixels is multiplexed.

According to a further aspect of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to q th source output blocks including a second output circuit that drives at least one source line of the plurality of source lines; and first and second precharge lines respectively supplying first and second precharge voltages for precharging each of a first output of the first output circuit and a second output of the second output circuit;

each of the first and second output circuits of the first and second driver blocks simultaneously supplying one of the first and second precharge voltages to the plurality of source lines, and then driving each of the plurality of source lines by time division based on multiplexed grayscale data in which grayscale data of each dot of pixels is multiplexed;

a voltage at the highest potential output to the plurality of source lines from each of the first and second output circuits being supplied as the first precharge voltage to a voltage supply point of the first precharge line provided so that a load from the voltage supply point to an edge of the pth source output block is equal to a load from the voltage supply point to an edge of the (p+1)th source output block; and a voltage at the lowest potential output to the plurality of source lines from each of the output circuits being supplied as the second precharge voltage to a voltage supply point of the second precharge line provided so that a load from the voltage supply point to an edge of the pth source output block is equal to a load from the voltage supply point to an edge of the (p+1)th source output block.

According to a further aspect of the invention, there is provided an electro-optical device comprising:

a plurality of gate lines;

the plurality of source lines;

a plurality of pixels, each of the plurality of pixels being specified by a gate line among the plurality of gate lines and a source line among the plurality of source lines;

a gate driver that scans the plurality of gate lines; and the above source driver that drives the plurality of source lines.

According to a further aspect of the invention, there is provided an electro-optical device comprising:

a plurality of gate lines;

the plurality of source lines;

a plurality of pixels, each of the plurality of pixels being specified by a gate line among the plurality of gate lines and a source line among the plurality of source lines;

a gate driver that scans the plurality of gate lines;

the above source driver that drives the plurality of source lines; and a demultiplexer that separates one output of the source driver into source lines among the source lines.

According to a further aspect of the invention, there is provided an electro-optical device comprising the above source driver.

According to a further aspect of the invention, there is provided an electronic instrument comprising the above electro-optical device.

According to a further aspect of the invention, there is provided an electronic instrument comprising the above source driver.

DETAILED DESCRIPTION OF THE EMBODIMENT

Figure 1:
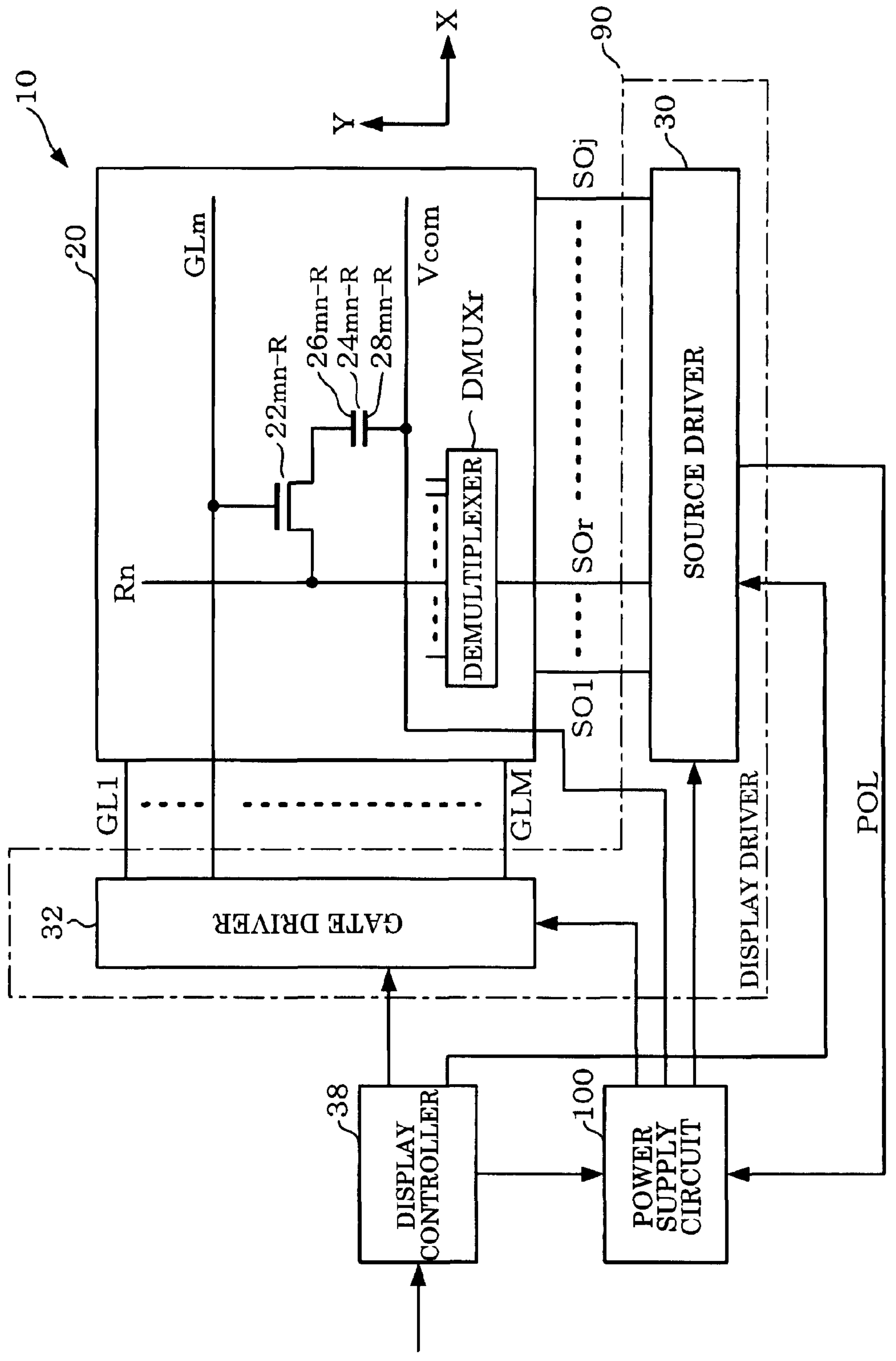
FIG. 1 is a view showing an outline of the configuration of an active matrix type liquid crystal device according to one embodiment of the invention.

Aspects of the invention may provide a source driver capable of precharging source lines using a precharge voltage which can be set with high accuracy, an electro-optical device, and an electronic instrument.

According to one embodiment of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to qth source output blocks including a second output circuit that drives at least one source line of the plurality of source lines; and a precharge line that supplies a precharge voltage for precharging each of a first output of the first output circuit and a second output of the second output circuit;

the precharge voltage being supplied to a voltage supply point of the precharge line provided so that a load from the voltage supply point to an edge of the pth source output block is equal to a load from the voltage supply point to an edge of the (p+1)th source output block.

According to this embodiment, even if the number p of source output blocks of the first driver block differs from the number (p−q) of source output blocks of the second driver block, the precharge voltage of the output circuit of the pth source output block can be made equal to the precharge voltage of the output circuit of the (p+1)th source output block. Therefore, the effective value of the pixel electrode connected with the source line driven by the output circuit of the pth source output block can be made equal to the effective value of the pixel electrode connected with the source line driven by the output circuit of the (p+1)th source output block, thereby suppressing deterioration in image quality caused by the difference between the effective values of the voltages applied to the pixels due to the difference in precharge voltage.

In the source driver according to this embodiment, each of the first and second output circuits may include:

an operational amplifier that drives the at least one source line of the plurality of source lines based on a grayscale voltage corresponding to grayscale data;

a first switching element inserted between the precharge line and an output of the operational amplifier; and a second switching element inserted between the precharge line and an input of the operational amplifier;

in a precharge period, the operational amplifier may drive each of the first and second outputs by a first current drive capability in a state in which the first switching element is turned OFF and the second switching element is turned ON, the operational amplifier may then drive each of the first and second outputs by a second current drive capability lower than the first current drive capability in a state in which the first switching element is turned ON and the second switching element is turned ON, and then the first switching element may be turned ON and the second switching element may be turned OFF; and in a drive period after the precharge period, the operational amplifier may drive each of the first and second outputs based on the grayscale voltage in a state in which the first switching element is turned OFF and the second switching element is turned OFF.

According to this embodiment, the voltage of the source output can be promptly set at the precharge voltage in the precharge period. Moreover, even if the voltage of the source output becomes lower to some extent than the precharge voltage due to the on-resistance of the first switching element, since a charge can be supplied to the output of the operational amplifier by the second current drive capability, the voltage of the source output can be accurately set at the precharge voltage. Furthermore, an increase in current consumption can be suppressed by reducing the second current drive capability.

According to another embodiment of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to qth source output blocks including a second output circuit that drives at least one source line of the plurality of source lines; and a voltage supply line that supplies a given voltage to each of a first output of the first output circuit and a second output of the second output circuit;

the given voltage being supplied to a voltage supply point of the voltage supply line provided so that a load from the voltage supply point to an edge of the pth source output block is equal to a load from the voltage supply point to an edge of the (p+1)th source output block; and after the given voltage has been supplied to the plurality of source lines, each of the first and second output circuits driving the plurality of source lines by time division based on multiplexed grayscale data in which grayscale data of each dot of pixels is multiplexed.

According to this embodiment, even if the effect on the effective value of the voltage applied to each dot of the pixels differs depending on a change in the voltage of the voltage supply line (i.e., multiplex drive), deterioration in image quality can be uniformly prevented by equalizing the voltages of the voltage supply lines, whereby the effect of the difference in voltage between the voltage supply lines can be minimized.

In the source driver according to this embodiment, the given voltage may be a precharge voltage.

In the source driver according to this embodiment, each of the first and second output circuits may include:

an operational amplifier that drives the at least one source line of the plurality of source lines based on a grayscale voltage corresponding to grayscale data;

a first switching element inserted between the voltage supply line and an output of the operational amplifier; and a second switching element inserted between the voltage supply line and an input of the operational amplifier;

in a voltage setting period, the operational amplifier may drive each of the first and second outputs by a first current drive capability in a state in which the first switching element is turned OFF and the second switching element is turned ON, the operational amplifier may then drive each of the first and second outputs by a second current drive capability lower than the first current drive capability in a state in which the first switching element is turned ON and the second switching element is turned ON, and then the first switching element may be turned ON and the second switching element may be turned OFF; and in a drive period after the voltage setting period, the operational amplifier may drive each of the first and second outputs based on the grayscale voltage in a state in which the first switching element is turned OFF and the second switching element is turned OFF.

According to this embodiment, the voltage of the source output can be promptly set at the given voltage in the voltage setting period. Moreover, even if the voltage of the source output becomes lower to some extent than the voltage of the voltage supply line due to the on-resistance of the first switching element, since a charge can be supplied to the output of the operational amplifier by the second current drive capability, the voltage of the source output can be accurately set at the voltage of the voltage supply line. Furthermore, an increase in current consumption can be suppressed by reducing the second current drive capability.

In the source driver according to this embodiment, the given voltage may be a first voltage of the plurality of source lines of the electro-optical device after short-circuiting the plurality of source lines; and each of the first and second output circuits may drive the plurality of source lines based on the grayscale data in a state in which the plurality of source lines are set at the first voltage after short-circuiting the plurality of source lines.

According to this embodiment, since the source lines can be driven in the drive period by recycling a charge stored in the source lines before driving the source lines, an unnecessary charge need not be supplied from the outside, whereby power consumption can be reduced while accurately setting the source lines at the voltage of the voltage supply line.

In the source driver according to this embodiment, the given voltage may be a second voltage of the plurality of source lines of the electro-optical device after short-circuiting the plurality of source lines and a common electrode opposite to pixel electrodes connected with the plurality of source lines via switching elements through an electro-optical substance; and each of the first and second output circuits may drive each of the plurality of source lines based on the grayscale data in a state in which the plurality of source lines are set at the second voltage after short-circuiting the plurality of source lines and the common electrode.

According to this embodiment, since the source lines can be driven in the drive period by recycling a charge stored in the source lines and the common electrode before driving the source lines, an unnecessary charge need not be supplied from the outside, whereby power consumption can be reduced while accurately setting the source lines at the voltage of the voltage supply line.

According to a further embodiment of the invention, there is provided a source driver that drives a plurality of source lines of an electro-optical device, the source driver comprising:

a first driver block including first to pth (p is an integer equal to or larger than two) source output blocks arranged along a first direction, each of the first to pth source output blocks including a first output circuit that drives at least one source line of the plurality of source lines;

a second driver block including (p+1)th to qth (p+1<q, q is an integer) source output blocks arranged along the first direction, each of the (p+1)th to q th source output blocks including a second output circuit that drives at least one source line of the plurality of source lines; and first and second precharge lines respectively supplying first and second precharge voltages for precharging each of a first output of the first output circuit and a second output of the second output circuit;

each of the first and second output circuits of the first and second driver blocks simultaneously supplying one of the first and second precharge voltages to the plurality of source lines, and then driving each of the plurality of source lines by time division based on multiplexed grayscale data in which grayscale data of each dot of pixels is multiplexed;

a voltage at the highest potential output to the plurality of source lines from each of the first and second output circuits being supplied as the first precharge voltage to a voltage supply point of the first precharge line provided so that a load from the voltage supply point to an edge of the pth source output block is equal to a load from the voltage supply point to an edge of the (p+1)th source output block; and a voltage at the lowest potential output to the plurality of source lines from each of the output circuits being supplied as the second precharge voltage to a voltage supply point of the second precharge line provided so that a load from the voltage supply point to an edge of the pth source output block is equal to a load from the voltage supply point to an edge of the (p+1)th source output block.

In the source driver according to this embodiment, each of the first and second output circuits may include:

an operational amplifier that drives the at least one source line of the plurality of source lines based on a grayscale voltage corresponding to the grayscale data;

a first switching element inserted between the first or second precharge line and an output of the operational amplifier; and a second switching element inserted between the first or second precharge line and an input of the operational amplifier;

in a precharge period, the operational amplifier may drive each of the first and second outputs by a first current drive capability in a state in which the first switching element is turned OFF and the second switching element is turned ON, the operational amplifier may then drive each of the first and second outputs by a second current drive capability lower than the first current drive capability in a state in which the first switching element is turned ON and the second switching element is turned ON, and then the first switching element may be turned ON and the second switching element may be turned OFF; and in a drive period after the precharge period, the operational amplifier may drive each of the first and second outputs based on the grayscale voltage in a state in which the first switching element is turned OFF and the second switching element is turned OFF.

According to the above embodiment, unnecessary precharging need not be performed by causing the precharge voltage to differ between the positive period and the negative period during polarity inversion drive, for example, whereby a reduction in power consumption and an increase in speed in the drive period can be achieved in combination.

In the source driver according to this embodiment, a multiplexed voltage obtained by multiplexing grayscale voltages of one horizontal scan period by time division may be input to an input of an operational amplifier of each of the first and second output circuits; and each of the source output blocks may include a demultiplexer for separating the output from the operational amplifier into the plurality of source lines in synchronization with a time division timing of the multiplexed voltage.

According to this embodiment, a configuration in which a demultiplexer is omitted can be employed for an electro-optical device. Therefore, an amorphous silicon liquid crystal panel which allows only a switching element with a low drive capability to be formed but can be produced at low cost can be used as the electro-optical device.

According to a further embodiment of the invention, there is provided an electro-optical device comprising:

a plurality of gate lines;

the plurality of source lines;

a plurality of pixels, each of the plurality of pixels being specified by a gate line among the plurality of gate lines and a source line among the plurality of source lines;

a gate driver that scans the plurality of gate lines; and one of the above source drivers that drives the plurality of source lines.

According to a further embodiment of the invention, there is provided an electro-optical device comprising:

a plurality of gate lines;

the plurality of source lines;

a plurality of pixels, each of the plurality of pixels being specified by a gate line among the plurality of gate lines and a source line among the plurality of source lines;

a gate driver that scans the plurality of gate lines;

one of the above source drivers that drives the plurality of source lines; and a demultiplexer that separates one output of the source driver into source lines among the source lines.

According to a further embodiment of the invention, there is provided an electro-optical device comprising one of the above source drivers.

According to the above embodiment, an electronic instrument can be provided which includes a source driver capable of precharging the source lines using a precharge voltage which can be set with high accuracy and prevents deterioration in image quality.

According to a further embodiment of the invention, there is provided an electronic instrument comprising one of the above electro-optical devices.

According to a further embodiment of the invention, there is provided an electronic instrument comprising one of the above source drivers.

According to the above embodiment, an electronic instrument can be provided to which a source driver capable of precharging the source lines using a precharge voltage which can be set with high accuracy is applied.

Embodiments of the invention are described below in detail with reference to the drawings. Note that the embodiments described below do not in any way limit the scope of the invention laid out in the claims. Note that all elements of the embodiments described below should not necessarily be taken as essential requirements for the invention.

1. Liquid Crystal Device

FIG. 1 shows an outline of the configuration of an active matrix type liquid crystal device according to one embodiment of the invention. Although the following description illustrates an active matrix type liquid crystal device, a driver circuit according to this embodiment may also be applied to other liquid crystal devices such as a passive matrix type liquid crystal device.

A liquid crystal device 10 includes an LCD panel (display panel in a broad sense; electro-optical device in a broader sense) 20. The LCD panel 20 is a low-temperature polysilicon liquid crystal panel or the like, and is formed on a glass substrate, for example. Gate lines (scan lines) GL1 to GLM (M is an integer equal to or larger than two), arranged in a direction Y and extending in a direction X, and source lines (data lines), arranged in the direction X and extending in the direction Y, are disposed on the glass substrate. One pixel is formed of two or more color components. The source lines corresponding to the color components of each pixel are disposed in the LCD panel 20. The following description illustrates an example in which one pixel is formed of three dots (RGB) and source lines R1, G1, B1, R2, G2, B2, . . . , RN, GN, and BN (N is an integer equal to or larger than two) are disposed in the LCD panel 20.

The source lines R1, G1, B1, R2, G2, B2, . . . , RN, GN, and BN are connected with demultiplexers DMUX1 to DMUXj ($1<j<N$; j is an integer) in units of two or more source lines. A signal from one output of the source driver 30 is divided by each demultiplexer and is output to two or more source lines. For example, N equals j×k when each demultiplexer is connected with k (k is an integer equal to or larger than two) source lines.

A pixel region (pixel) is provided corresponding to the intersection of the gate line GLm ($1 \leqq m \leqq M$; m is an integer; hereinafter the same) and the source line Rn (or, Gn or Bn) ($1 \leqq n \leqq N$; n is an integer; hereinafter the same). A thin film transistor (hereinafter abbreviated as "TFT") 22_mn_-R is disposed in the pixel region.

The gate of the TFT 22_mn_-R is connected with the gate line GLn. The source of the TFT 22_mn_-R is connected with the source line Rn. The drain of the TFT 22_mn_-R is connected with a pixel electrode 26_mn_-R. A liquid crystal (electro-optical element in a broad sense) is sealed between the pixel electrode 26_mn_-R and a common electrode 28_mn_-R opposite to the pixel electrode 26_mn_-R so that a liquid crystal capacitor (liquid crystal element in a broad sense) 24_mn_-R is formed. The transmissivity of the pixel changes depending on the voltage applied between the pixel electrode 26_mn_-R and the common electrode 28_mn_-R. A common electrode voltage Vcom is supplied to the common electrode 28_mn_-R.

The LCD panel 20 is formed by attaching a first substrate provided with the pixel electrode and the TFT to a second substrate provided with the common electrode, and sealing a liquid crystal as an electro-optical material between the substrates, for example.

Therefore, the LCD panel 20 includes the pixel electrode connected with the source line through the TFT as a switching element. In other words, the LCD panel 20 includes the gate lines, the source lines, the switching elements, and the pixel electrodes respectively connected with the source lines through the switching elements.

The liquid crystal device 10 includes a display driver (driver circuit in a broad sense) 90 which drives the LCD panel 20. The display driver 90 includes a source driver 30. The source driver 30 drives the source line of the LCD panel 20 based on grayscale data corresponding to each source output. Specifically, the source driver 30 causes the demultiplexers DMUX1 to DMUXj of the LCD panel 20 to divide source outputs SO1 to SOj and supply the grayscale voltages corresponding to the grayscale data to the source lines R1 to B1, R2 to B2, . . . , and RN to BN. In FIG. 1, the source output SOr ($1 \leqq r \leqq j$; r is an integer) of the source driver 30 is connected with the demultiplexer DMUXr, and the source line Rn is connected with the output of the demultiplexer DMUXr.

In this embodiment, each of the demultiplexers DMUX1 to DMUXj of the LCD panel 20 divides and outputs one output of the source driver 30 to the source lines of two pixels. Note that the invention is not limited to the number of pixels.

Figure 2:
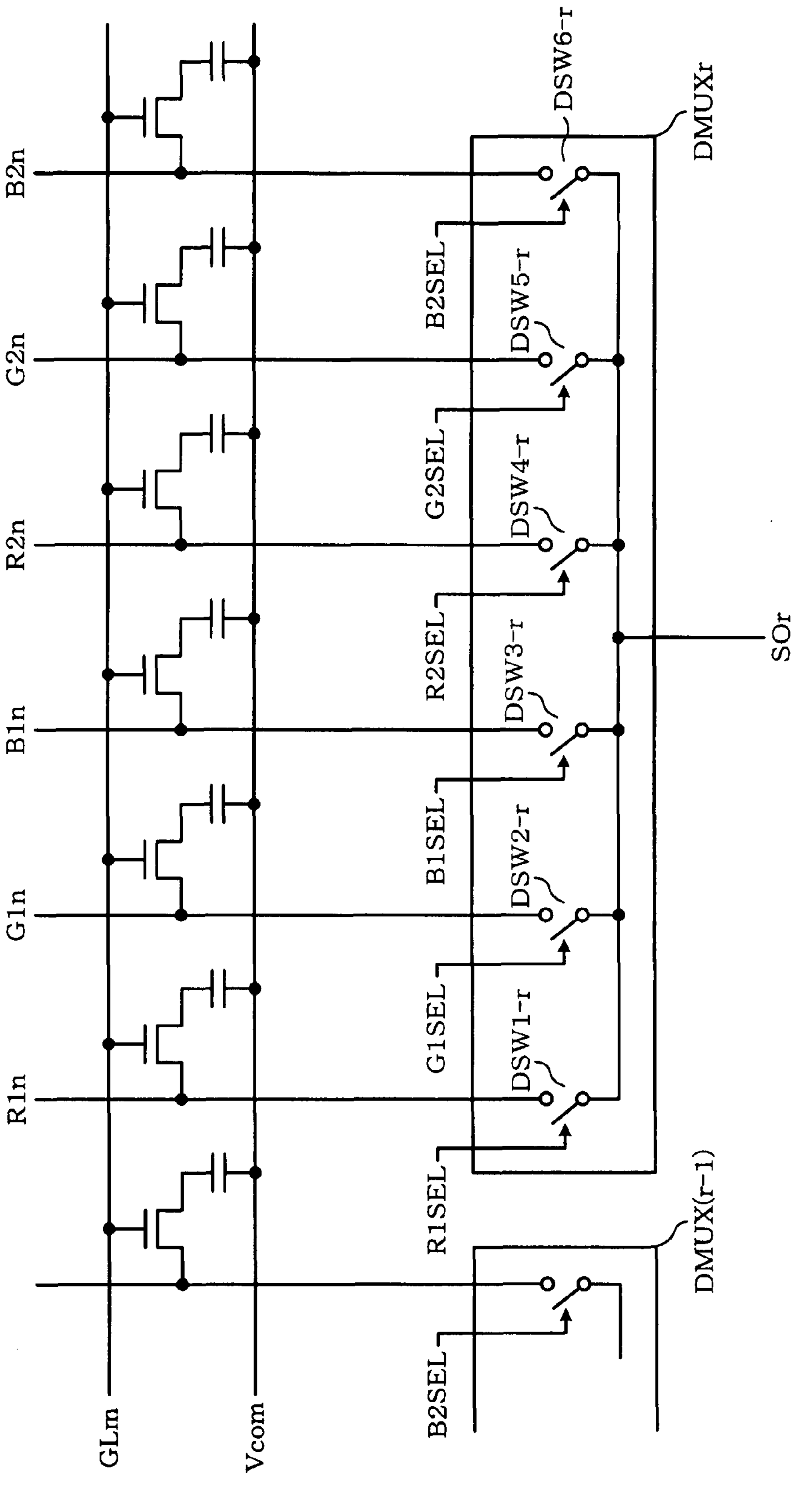
FIG. 2 is a view showing the main portion of the configuration of an LCD panel when separately outputting one output of a source driver according to one embodiment of the invention to source lines of two pixels.

FIG. 2 schematically shows the main portion of the configuration of the LCD panel 20 when one output of source driver 30 is divided and output to the source lines of two pixels.

FIG. 2 shows a configuration example of the demultiplexer DMUXr which divides and outputs the source output SOr of the source driver 30 to source lines R1_n_, G1_n_, B1_n_, R2_n_, G2_n_, and B2_n_ of two pixels. The demultiplexer DMUXr includes demultiplex switches DSW1-_r_ to DSW6-_r_.

The demultiplex switch DSW1-_r_ is switch-controlled using a multiplex control signal R1SEL. The demultiplex switch DSW2-_r_ is switch-controlled using a multiplex control signal G1SEL. The demultiplex switch DSW3-_r_ is switch-controlled using a multiplex control signal B1SEL. The demultiplex switch DSW4-_r_ is switch-controlled using a multiplex control signal R2SEL. The demultiplex switch DSW5-_r_ is switch-controlled using a multiplex control signal G2SEL. The demultiplex switch DSW6-_r_ is switch-controlled using a multiplex control signal B2SEL.

As shown in FIG. 1, the display driver 90 may include a gate driver (scan driver in a broad sense) 32. The gate driver 32 scans the gate lines GL1 to GLM of the LCD panel 20 in one vertical scan period. The display driver 90 may have a configuration in which at least one of the source driver 30 and the gate driver 32 is omitted.

The liquid crystal device 10 may include a power supply circuit 100. The power supply circuit 100 generates voltages necessary for driving the source lines, and supplies the generated voltages to the source driver 30. The power supply circuit 100 generates power supply voltages VDDH and VSSH necessary for the source driver 30 to drive the source lines and voltages for a logic section of the source driver 30, for example.

The power supply circuit 100 also generates voltages necessary for scanning the gate lines, and supplies the generated voltages to the gate driver 32.

The power supply circuit 100 also generates the common electrode voltage Vcom. The power supply circuit 100 outputs the common electrode voltage Vcom, which is periodically set at a high-potential-side voltage VCOMH and a low-potential-side voltage VCOML in synchronization with the timing of a polarity inversion signal POL generated by the source driver 30, to the common electrode of the LCD panel 20.

The liquid crystal device 10 may include a display controller 38. The display controller 38 controls the source driver 30, the gate driver 32, and the power supply circuit 100 according to information set by a host (not shown) such as a central processing unit (hereinafter abbreviated as "CPU"). For example, the display controller 38 sets the operation mode of the source driver 30 and the gate driver 32 and supplies a vertical synchronization signal and a horizontal synchronization signal generated therein to the source driver 30 and the gate driver 32.

In FIG. 1, the liquid crystal device 10 is configured to include the power supply circuit 100 and the display controller 38. Note that at least one of the power supply circuit 100 and the display controller 38 may be provided outside the liquid crystal device 10. The liquid crystal device 10 may be configured to include the host.

The source driver 30 may include at least one of the gate driver 32 and the power supply circuit 100.

Figure 3:
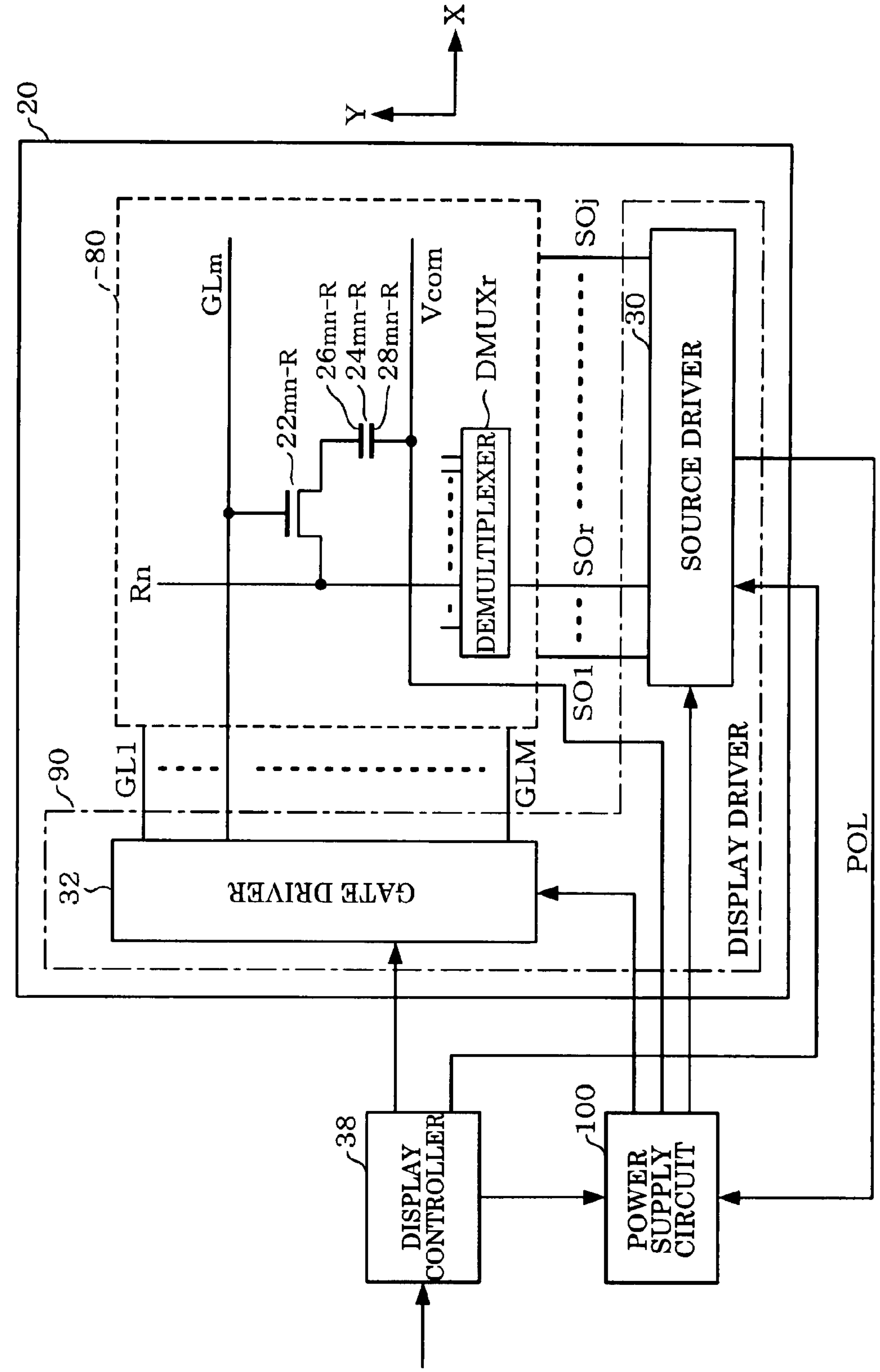
FIG. 3 is a view showing an outline of another configuration of an active matrix type liquid crystal device according to one embodiment of the invention.

Some or all of the source driver 30, the gate driver 32, the display controller 38, and the power supply circuit 100 may be formed on the LCD panel 20. In FIG. 3, the display driver 90 (source driver 30 and gate driver 32) is formed on the LCD panel 20, for example. Specifically, the LCD panel 20 may be configured to include source lines, gate lines, switching elements respectively connected with the gate lines and the source lines, and a source driver which drives the source lines. Pixels are formed in a pixel formation area 80 of the LCD panel 20.

2. Gate Driver

Figure 4:
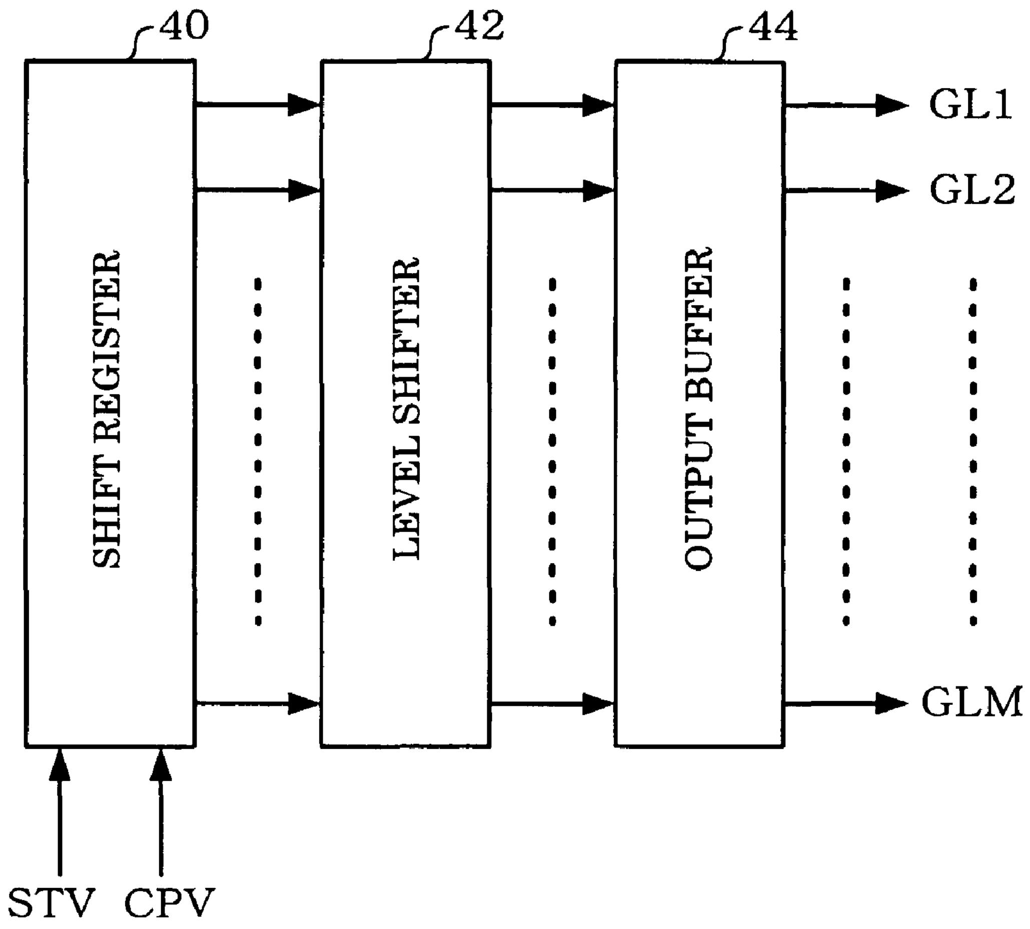
FIG. 4 is a block diagram showing a configuration example of a gate driver shown in FIG. 1 or 3.

FIG. 4 shows a configuration example of the gate driver 32 shown in FIG. 1 or 3.

The gate driver 32 includes a shift register 40, a level shifter 42, and an output buffer 44.

The shift register 40 includes flip-flops provided corresponding to the gate lines and sequentially connected. The shift register 40 holds a start pulse signal STV in the flip-flop in synchronization with a clock signal CPV, and sequentially shifts the start pulse signal STV to the adjacent flip-flops in synchronization with the clock signal CPV. The clock signal CPV is a horizontal synchronization signal, and the start pulse signal STV is a vertical synchronization signal.

The level shifter 42 shifts the level of the voltage output from the shift register 40 to a voltage level corresponding to the liquid crystal element of the LCD panel 20 and the transistor performance of the TFT. A high voltage level of 20 to 50 V is required as the voltage level, for example.

The output buffer 44 buffers the scan voltage shifted by the level shifter 534, and drives the gate line by outputting the scan voltage to the gate line. The high-potential-side voltage of the pulsed scan voltage is a select voltage, and the low-potential-side voltage of the pulsed scan voltage is an unselect voltage.

The gate driver 32 may scan the gate lines by selecting the gate line corresponding to the decoding result of an address decoder instead of scanning the gate lines using the shift register, differing from FIG. 4.

3. Source Driver

Figure 5:
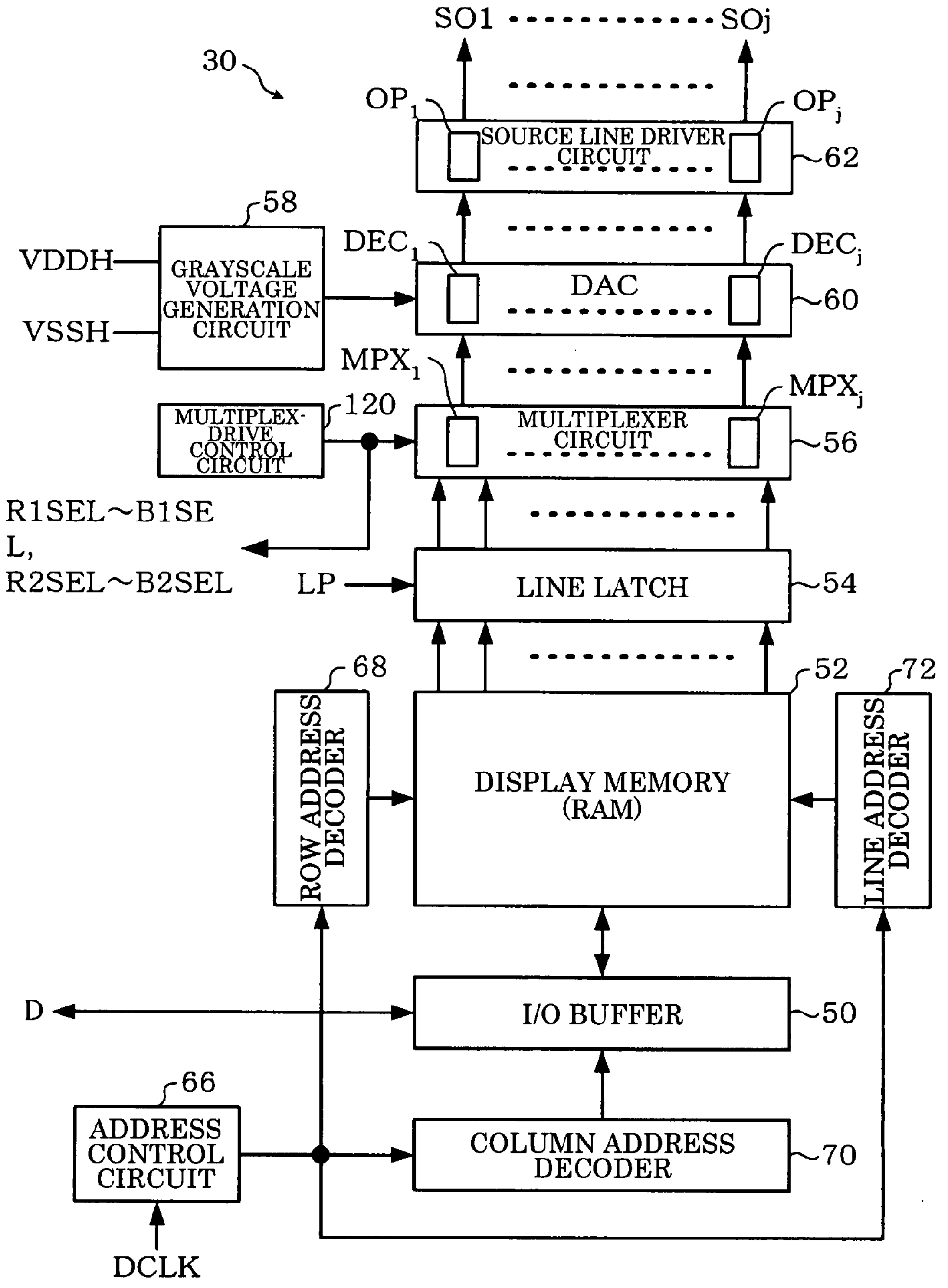
FIG. 5 is a block diagram showing a configuration example of a source driver shown in FIG. 1 or 3.

FIG. 5 is a block diagram showing a configuration example of the source driver 30 shown in FIG. 1 or 3.

The source driver 30 includes an I/O buffer 50, a display memory 52, a line latch 54, a multiplexer circuit 56, a grayscale voltage generation circuit 58, a digital/analog converter (DAC) 60, a source line driver circuit 62, and a multiplex-drive control circuit 120.

Grayscale data D is input to the source driver 30 from the display controller 38, for example. The grayscale data D is input in synchronization with a dot clock signal DCLK, and buffered by the I/O buffer 50. The dot clock signal DCLK is supplied from the display controller 38.

The I/O buffer 50 is accessed from the display controller 38 or the host (not shown). The grayscale data buffered by the I/O buffer 50 is written into the display memory 52. The grayscale data read from the display memory 52 is buffered by the I/O buffer 50, and output to the display controller 38 and the like.

The display memory 52 (grayscale data memory) includes memory cells respectively provided corresponding to output lines connected with the source lines. Each memory cell is specified by a row address and a column address. The memory cells of one scan line are specified by a line address.

An address control circuit 66 generates the row address, the column address, and the line address for specifying the memory cell in the display memory 52. The address control circuit 66 generates the row address and the column address when writing the grayscale data into the display memory 52. Specifically, the grayscale data buffered by the I/O buffer 50 is written into the memory cell of the display memory 52 specified by the row address and the column address.

A row address decoder 68 decodes the row address and selects the memory cells of the display memory 52 corresponding to the row address. A column address decoder 70 decodes the column address and selects the memory cells of the display memory 52 corresponding to the column address.

The address control circuit 66 generates the line address when reading the grayscale data from the display memory 52 and outputting the grayscale data to the line latch 54. Specifically, a line address decoder 72 decodes the line address and selects the memory cells of the display memory 52 corresponding to the line address. The grayscale data of one horizontal scan read from the memory cells specified by the line address is output to the line latch 54.

The address control circuit 66 generates the row address and the column address when reading the grayscale data from the display memory 52 and outputting the grayscale data to the I/O buffer 50. Specifically, the grayscale data held by the memory cell of the display memory 52 specified by the row address and the column address is read into the I/O buffer 50. The grayscale data read into the I/O buffer 50 is acquired by the display controller 38 or the host (not shown).

Therefore, the row address decoder 68, the column address decoder 70, and the address control circuit 66 shown in FIG.

5 function as a write control circuit which controls writing of the grayscale data into the display memory 52. The line address decoder 72, the column address decoder 70, and the address control circuit 66 shown in FIG. 5 function as a read control circuit which controls reading of the grayscale data from the display memory 52.

The line latch 54 latches the grayscale data of one horizontal scan read from the display memory 52 at the change timing of a latch pulse LP which specifies one horizontal scan period. The line latch 54 includes registers, each of which holds the grayscale data of one dot. The grayscale data of one dot read from the display memory 52 is written into each register of the line latch 54.

The multiplexer circuit 56 includes multiplexers $MPX_1$ to $MPX_j$. Each multiplexer generates multiplexed data in which the grayscale data of one horizontal scan latched by the line latch 54 is time-division multiplexed in units of two pixels (=six dots).

Figure 6:
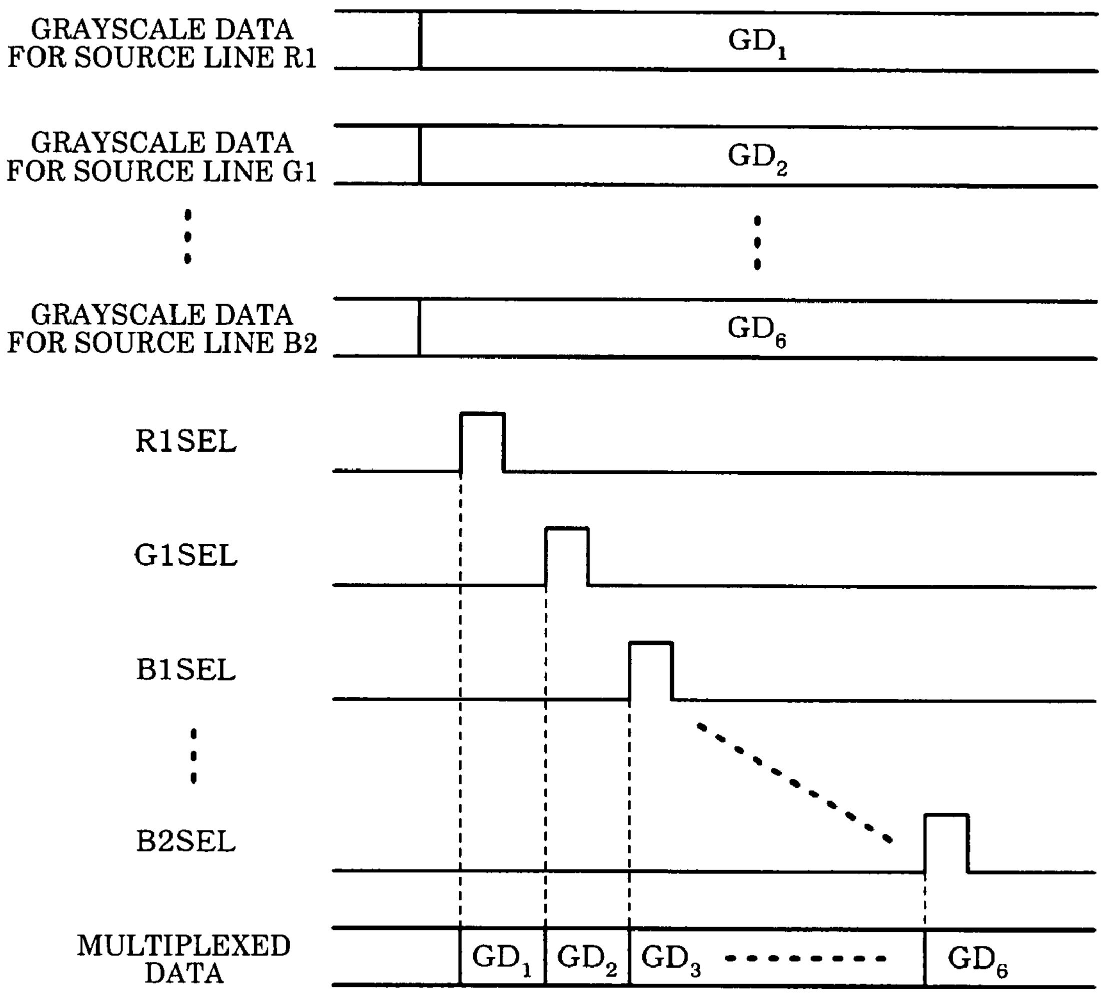
FIG. 6 is a view illustrative of the operation of a multiplexer circuit shown in FIG. 5.

FIG. 6 is a view illustrative of the operation of the multiplexer circuit 56 shown in FIG. 5.

FIG. 6 shows an operation example of the multiplexer $MPX_n$ among the multiplexers $MPX_1$ to $MPX_j$ of the multiplexer circuit 56. The multiplexer $MPX_n$ generates multiplexed data in which the grayscale data corresponding to the source lines R1*n*, G1*n*, B1*n*, R2*n*, G2*n*, and B2*n* is time-division multiplexed. Specifically, grayscale data $GD_1$ to $GD_6$ corresponding to the source lines R1*n*, G1*n*, B1*n*, R2*n*, G2*n*, and B2*n* latched by the line latch 54 is multiplexed by the multiplexer $MPX_n$ of the multiplexer circuit 56. Multiplex control signals R1SEL, G1SEL, B1SEL, R2SEL, G2SEL, and B2SEL which specify the time division timing are input to each of the multiplexers $MPX_1$ to $MPX_j$. The multiplex control signals R1SEL, G1SEL, B1SEL, R2SEL, G2SEL, and B2SEL are generated by the multiplex-drive control circuit 120 of the source driver 30. The multiplex-drive control circuit 120 generates the multiplex control signals R1SEL, G1SEL, B1SEL, R2SEL, G2SEL, and B2SEL so that one of the multiplex control signals R1SEL, G1SEL, B1SEL, R2SEL, G2SEL, and B2SEL is sequentially set at the H level in one horizontal scan period. The grayscale data corresponding to each multiplex control signal is output as the multiplexed data in a period in which the multiplex control signal is set at the H level.

In FIG. 5, the grayscale voltage generation circuit 58 generates grayscale voltages (reference voltages), each of which corresponds to each piece of grayscale data. Specifically, the grayscale voltage generation circuit 58 generates the grayscale voltages, each of which corresponds to each piece of grayscale data, based on a high-potential-side power supply voltage VDDH and a low-potential-side power supply voltage VSSH.

The DAC 60 generates the grayscale voltage corresponding to the grayscale data multiplexed into the multiplexed data from each multiplexer of the multiplexer circuit 56 in source output units. Specifically, the DAC 60 selects the grayscale voltage corresponding to each piece of grayscale data multiplexed into the multiplexed data from each multiplexer of the multiplexer circuit 56 from the grayscale voltages generated by the grayscale voltage generation circuit 58, and outputs the selected grayscale voltage as a multiplexed grayscale voltage. The DAC 60 includes voltage select circuits $DEC_1$ to $DEC_j$ provided in source output units. Each voltage select circuit outputs one grayscale voltage corresponding to the grayscale data of the multiplexed data selected from the grayscale voltages from the grayscale voltage generation circuit 58.

The source line driver circuit 62 includes output circuits $OP_1$ to $OP_j$. Each of the output circuits $OP_1$ to $OP_j$ includes a voltage-follower-connected operational amplifier. Each output circuit performs impedance conversion using the multiplexed grayscale voltage from each voltage select circuit of the DAC 60, and drives its output. A precharge voltage generated inside or outside of the source driver 30 is supplied to each output circuit, for example. Each output circuit can precharge the source line before driving the source output.

The multiplex-drive control circuit 120 supplies the multiplex control signals R1SEL, G1SEL, B1SEL, R2SEL, G2SEL, and B2SEL to the demultiplexers DMUX1 to DMUXj of the LCD panel 20.

Figure 7:
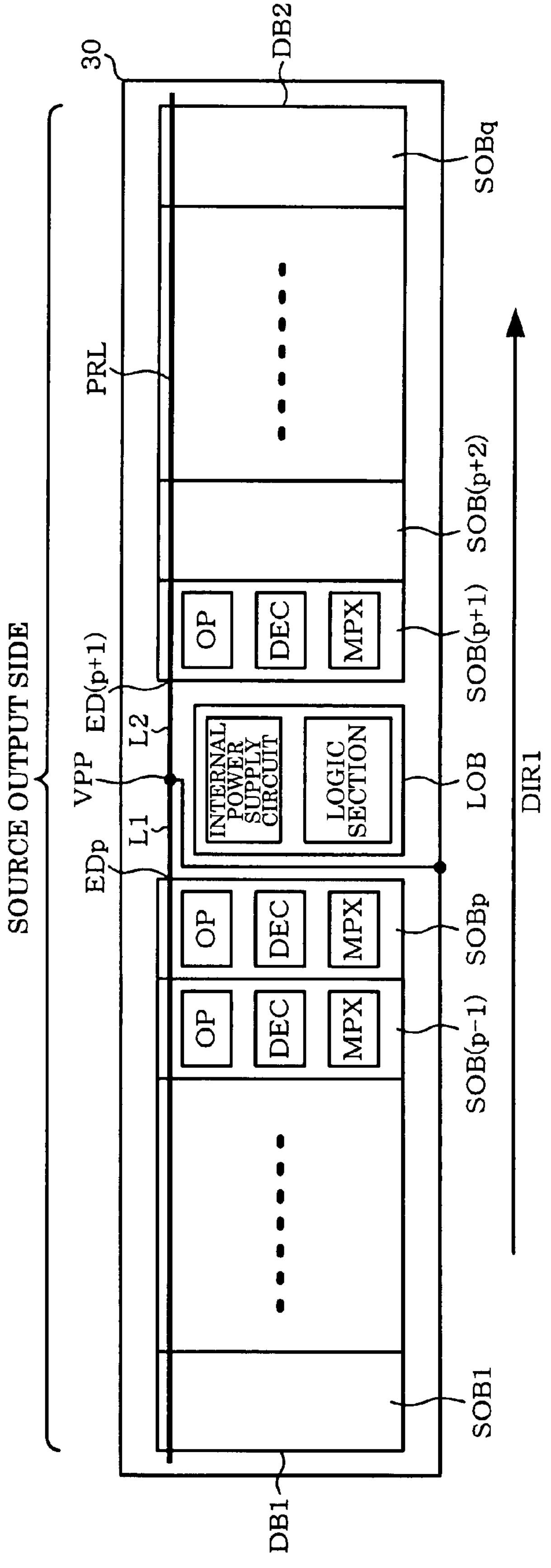
FIG. 7 is a view showing a chip image of a source driver according to one embodiment of the invention.

FIG. 7 shows a chip image of the source driver 30 according to this embodiment.

Since the source driver 30 is disposed on the end of the LCD panel 20 along the arrangement direction of the source lines of the LCD panel 20, the source driver 30 is formed on a narrow chip. Therefore, the source driver 30 is divided into driver blocks respectively provided to drive the source lines taking into account the layout efficiency, the wiring length, and the like. A logic section used in common by the driver blocks on either side and a block which generates various power supply voltages are disposed in the area between the driver blocks.

In the source driver 30 according to this embodiment, the driver block including output circuits for driving the source lines of the LCD panel 20 is divided into first and second driver blocks DB1 and DB2 on either side of the logic section and a block LOB which generates various power supply voltages, the first and second driver blocks DB1 and DB2 being arranged along an arrangement direction DIR1 (first direction) of the source outputs SO1 to SOj. The first driver block DB1 includes first to pth (p is an integer equal to or larger than two) source output blocks SOB1 to SOBp arranged along the arrangement direction DIR1, each of the source output blocks including an output circuit for driving the source lines. The second driver block DB2 includes (p+1)th to qth (p+1<q; q is an integer) source output blocks SOB(p+1) to SOBq arranged along the arrangement direction DIR1, each of the source output blocks including an output circuit for driving the source lines. Each of the first to qth source output blocks SOB1 to SOBq has the same configuration, and may include the output circuit, the voltage select circuit, the multiplexer, the line latch of one source output, and the display memory of one source output shown in FIG. 5.

The number of source output blocks of the first driver block DB1 is p, and the number of source output blocks of the second driver block DB2 is (q−p). p may differ from (q−p). Note that p may be equal to (q−p) in order to equate the load from the block LOB to the first source output block SOB1 and the load from the block LOB to the qth source output block SOBq.

The output circuit of each of the first to qth source output blocks SOB1 to SOBq can precharge the source line before driving the source line (i.e., precharge the output of the output circuit). Therefore, a precharge voltage PV generated by an internal power supply circuit provided in the block LOB or the power supply circuit 100 provided outside the source driver 30 is supplied to each source output block. The source driver 30 includes a precharge line PRL for supplying the precharge voltage to each source output block. The precharge line PRL is disposed along the arrangement direction DIR1 in the area in which the output circuits (source output side of the source driver 30) are arranged. The precharge line PRL may be linearly disposed along the arrangement direction DIR1, or may be disposed approximately along the arrangement direction DIR1 while turning in the direction perpendicular to the arrangement direction DIR1 at one or more points.

A voltage supply point VPP of the precharge voltage PV from the internal power supply circuit provided in the block LOB or the power supply circuit 100 provided outside the source driver 30 is provided on the precharge line PRL disposed along the arrangement direction DIR1. The voltage supply point VPP is provided in the area between the first and second driver blocks DB1 and DB2. The voltage supply point VPP is provided so that the load from the voltage supply point VPP to an edge EDp of the pth source output block equals the load from the voltage supply point VPP to an edge ED(p+1) of the (p+1)th source output block. The precharge voltage PV is supplied to the voltage supply point VPP. For example, the voltage supply point VPP is provided so that a wiring distance L1 between the voltage supply point VPP and the edge EDp of the pth source output block equals a wiring distance L2 between the voltage supply point VPP and the edge ED(p+1) of the (p+1)th source output block.

The edge EDp of the pth source output block may be referred to as a position at which the block LOB-side edge of the area of the first driver block DB1 intersects the precharge line PRL. The edge ED(p+1) of the (p+1)th source output block may be referred to as a position at which the block LOB-side edge of the area of the second driver block DB2 intersects the precharge line PRL.

According to related-art technology, since the accuracy of the precharge voltage is not required, the voltage supply point has been provided in the free area between the first and second driver blocks DB1 and DB2 while giving priority to other lines or connecting the lines to the voltage supply point along the shortest path, taking into account the layout efficiency and the placement and routing state. On the other hand, this embodiment provides the voltage supply point on the precharge line so that the load becomes equal at the sacrifice of layout efficiency.

This equates the precharge voltage of the output circuit of the pth source output block SOBp and the precharge voltage of the output circuit of the (p+1)th source output block SOB (p+1). Therefore, the effective value of the pixel electrode connected with the source line driven by the output circuit of the pth source output block SOBp can be made equal to the effective value of the pixel electrode connected with the source line driven by the output circuit of the (p+1)th source output block SOB(p+1), thereby suppressing deterioration in image quality caused by the difference in the effective value of the voltage applied to the pixel due to the difference in precharge voltage.

A comparative example of this embodiment is described below.

Figure 8:
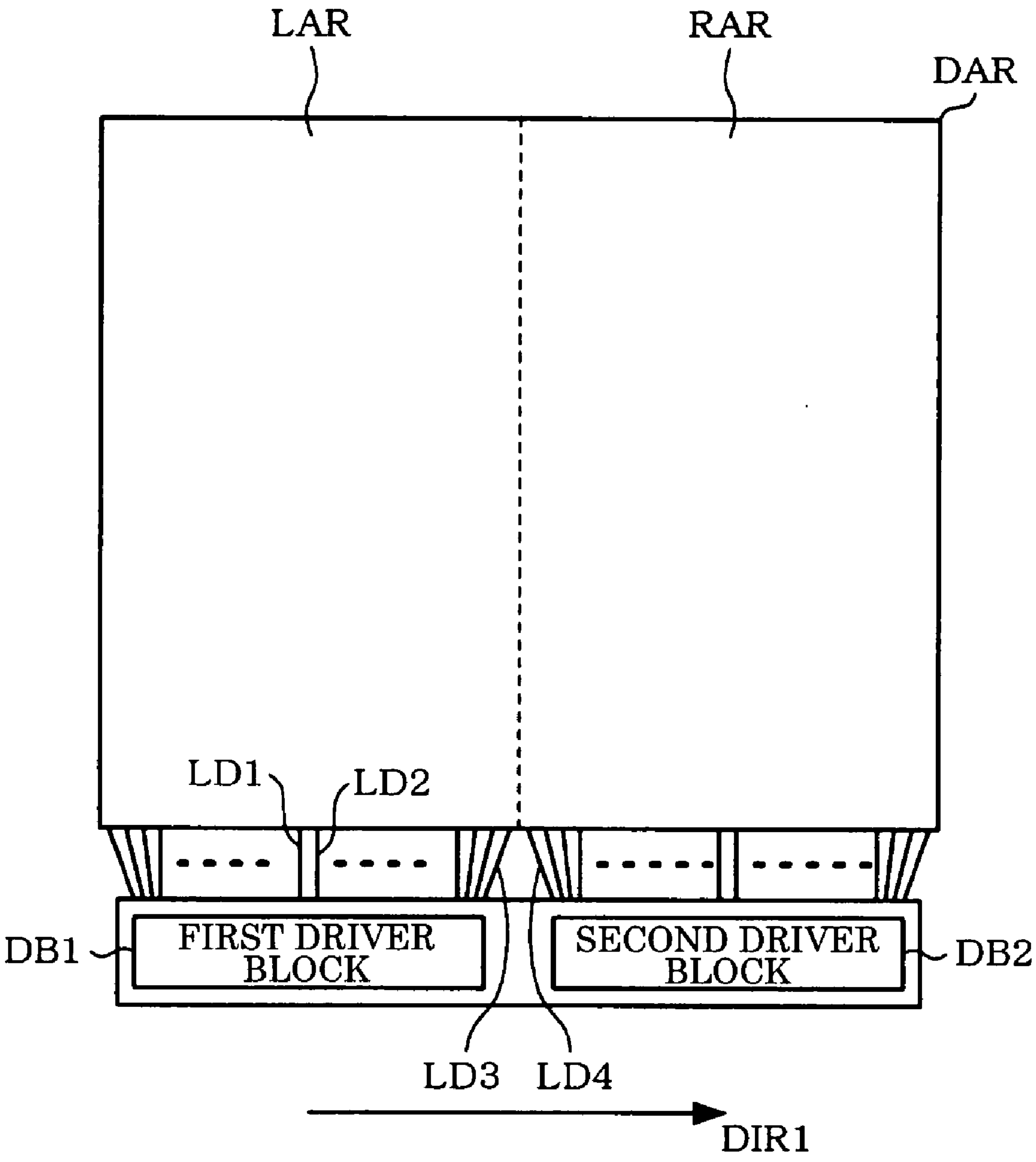
FIG. 8 is a view showing a source driver and an LCD panel according to a comparative example of one embodiment of the invention.

FIG. 8 shows a source driver and an LCD panel according to the comparative example of this embodiment.

When a driver block including output circuits for driving source lines of the LCD panel is divided into first and second driver blocks DB1 and DB2 in the source driver of the comparative example, the first driver block DB1 drives the source lines in a left display area LAR of a display area DAR of the LCD panel, and the second driver block DB2 drives the source lines in a right display area RAR of the display area DAR of the LCD panel.

The difference in precharge voltage supplied through the precharge line PRL is small between source output blocks of the first driver block DB1, and the difference in precharge voltage supplied through the precharge line PRL is small between source output blocks of the second driver block DB2. This is because the difference in load (LD1 and LD2 in FIG. 8) due to the difference in wiring length of signal lines in the chip, bonding wires, and the like is small between the source output blocks of each driver block.

On the other hand, since the block LOB is disposed in the area between the source output block positioned on the end of the first driver block DB1 in the arrangement direction DIR1 (pth source output block SOBp in FIG. 7) and the source output block positioned on the end of the second driver block DB2 in the direction opposite to the arrangement direction DIR1 ((p+1)th source output block SOB(p+1) in FIG. 7), the load (LD3 and LD4 in FIG. 8) increases due to the difference in wiring length, whereby the effect of a small difference in precharge voltage on the difference in effective value of the voltage increases.

Figure 9:
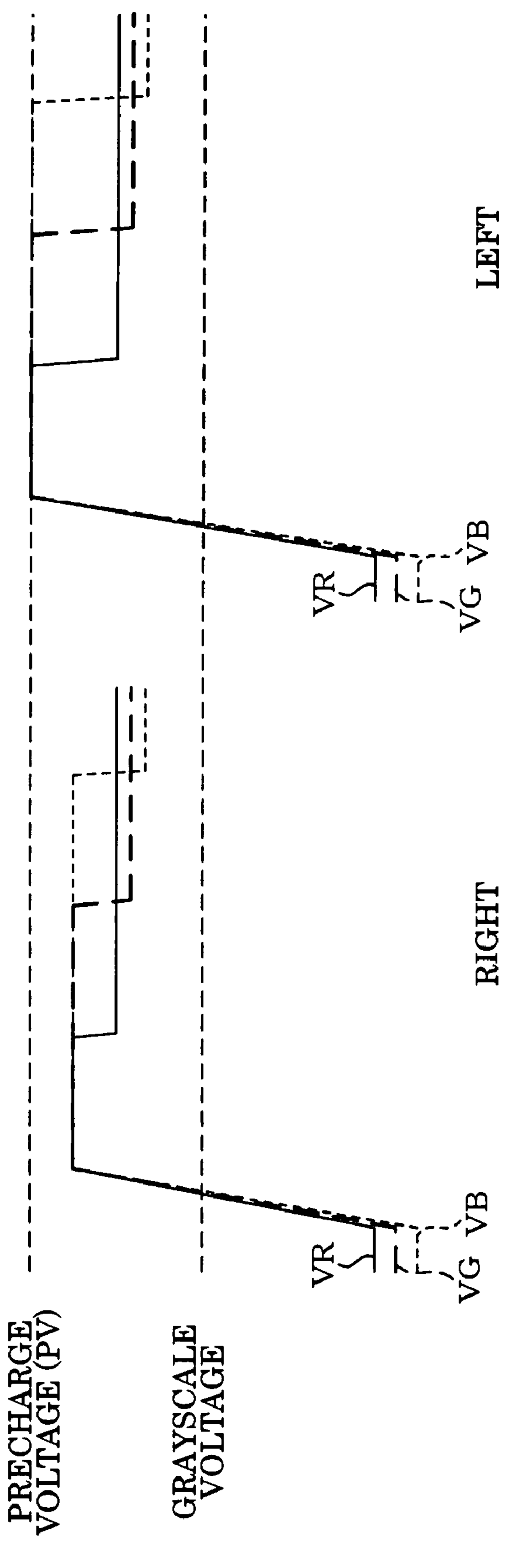
FIG. 9 is a view showing an example of a voltage applied to a display area of the LCD panel shown in FIG. 8.

FIG. 9 shows an example of the voltage applied to the display area DAR of the LCD panel shown in FIG. 8.

As shown in FIG. 9, while the precharge voltage of the source line in the right display area RAR of the LCD panel does not reach the precharge voltage PV which should be applied, the precharge voltage PV is applied to the source line in left display area LAR of the LCD panel. In this case, since the effective value of the voltage applied to the pixel connected with the source line in the right display area RAR differs from the effective value of the voltage applied to the pixel connected with the source line in the left display area LAR, a difference in display image occurs even if the same grayscale voltage is applied in a drive period subsequent to a precharge period (voltage setting period in a broad sense), whereby the image quality deteriorates.

In this embodiment, the precharge voltage PV is supplied to the voltage supply point provided so that the load from the voltage supply point to the edge of each driver block becomes equal irrespective of whether the numbers of source output blocks of the first and second driver blocks are the same or different. This equates the precharge voltage of the source line driven by the pth source output block SOBp and the precharge voltage of the source line driven by the (p+1)th source output block SOB(p+1). Therefore, since the effective value of the voltage applied to the pixel connected with the source line in the right display area RAR becomes equal to the effective value of the voltage applied to the pixel connected with the source line in the left display area LAR, a situation can be reliably prevented in which a difference in display image occurs even if the same grayscale voltage is applied in the drive period subsequent to the precharge period. In particular, even if the number p of source output blocks of the first driver block DB1 differs from the number (q−p) of source output blocks of the second driver block DB2, a situation in which a difference in display image occurs can be prevented, differing from the comparative example.

Although FIG. 7 illustrates the case of dividing the source driver block into two blocks, the invention is not limited to the number of blocks into which the source driver block is divided. This also applies to the case where a block such as the logic section is disposed between two divided source driver blocks and the precharge voltage is supplied to the voltage supply point of the precharge line provided so that the load from the block to the edge of each source driver block on each side becomes equal.

3.1 Detailed Configuration Example

A detailed configuration example of the source driver 30 according to this embodiment is described below.

Figure 10:
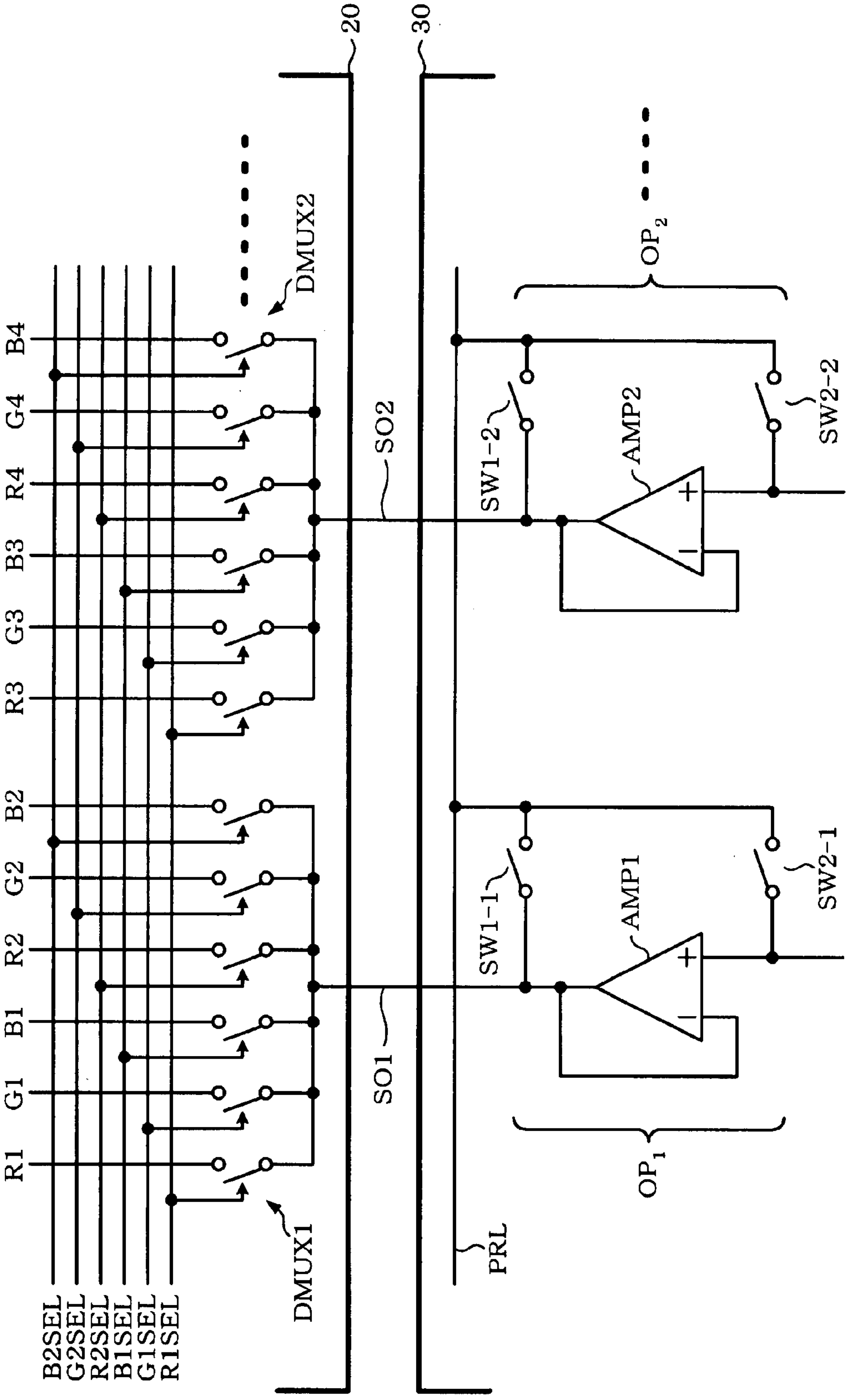
FIG. 10 is a view showing a detailed configuration example of an output circuit shown in FIG. 5 and a demultiplexer of an LCD panel.

FIG. 10 shows a detailed configuration example of the output circuit shown in FIG. 5 and the demultiplexer of the LCD panel 20. In FIG. 10, the same sections as in FIG. 5 are indicated by the same symbols. Description of these sections is appropriately omitted.

FIG. 10 shows a configuration example of the output circuits $OP_1$ and $OP_2$ of the source driver 30 connected with the source outputs SO1 and SO2 and the demultiplexers DMUX1 and DMUX2 of the LCD panel 20. Note that other output circuits and other demultiplexers have the same configuration as the configuration shown in FIG. 10. The following description focuses on the output circuit $OP_1$ and the demultiplexer DMUX1.

The output circuit $OP_1$ includes an operational amplifier AMP1 and first and second switching elements SW1-1 and SW2-1. The operational amplifier AMP1 drives the source line based on the grayscale voltage corresponding to the grayscale data. The first switching element SW1-1 is inserted between the precharge line PRL and the output of the operational amplifier AMP1. The second switching element SW2-1 is inserted between the precharge line PRL and the input of the operational amplifier AMP1.

The demultiplexer DMUX1 performs an operation reverse of that of the multiplexer of the multiplexer circuit 56 of the source driver 30 corresponding to the demultiplexer DMUX1. Specifically, each demultiplexer outputs the multiplexed grayscale voltage from each output circuit of the source line driver circuit 62 to six source lines by time division. The time division output timing of the demultiplexer DMUX1 is synchronized with the time division timing of each multiplexer of the multiplexer circuit 56.

Figure 11:
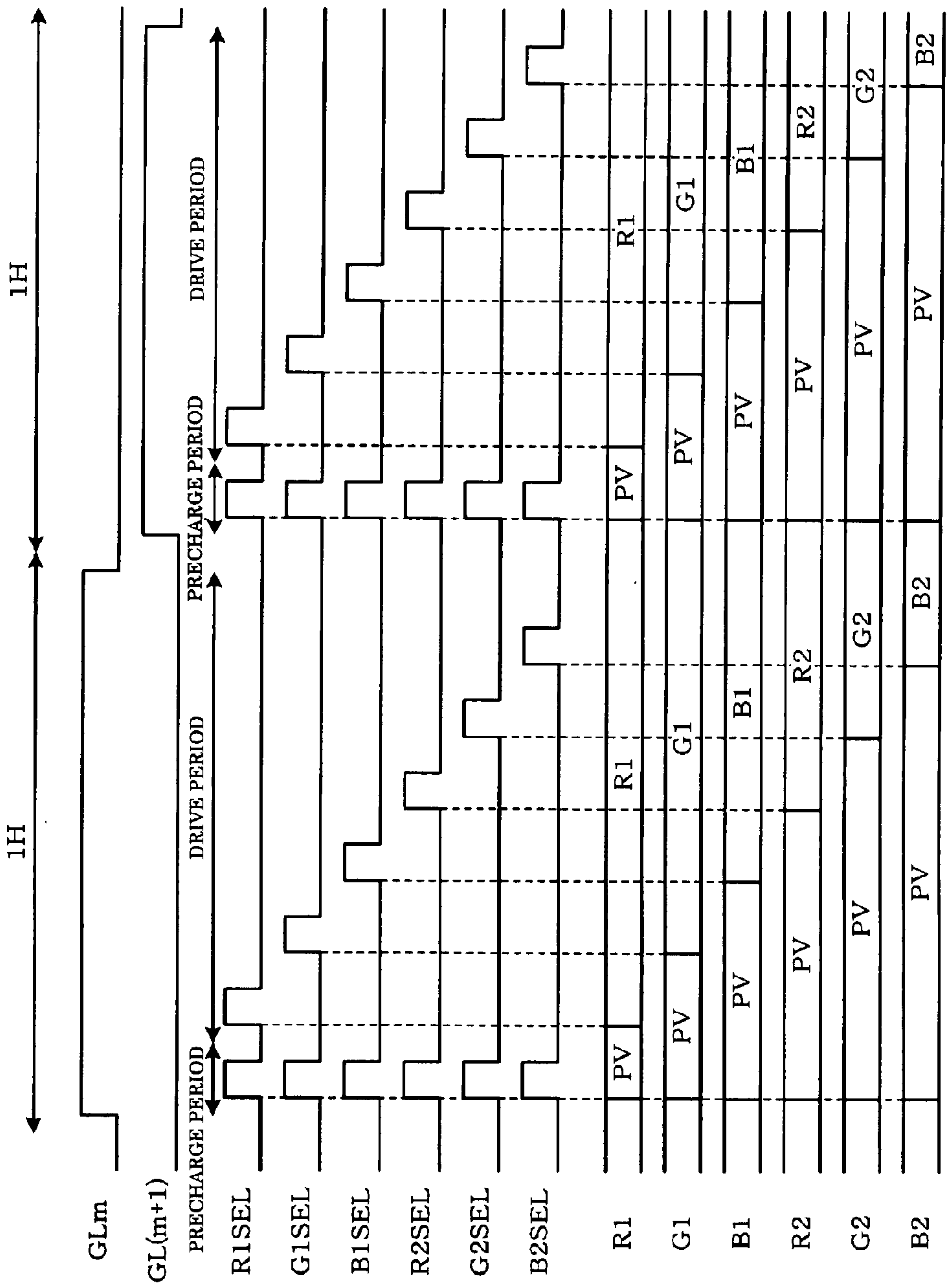
FIG. 11 is a view showing an operation example of a source driver according to one embodiment of the invention.

FIG. 11 shows an operation example of the source driver 30 according to this embodiment.

FIG. 11 focuses on the source lines R1, G1, B1, R2, G2, and B2 connected with the gate lines GLm and GL(m+1). Note that the same description also applies to other source lines.

For example, when the select period in which the gate line GLm is selected is referred to as one horizontal scan period (1H), the precharge period (voltage setting period in a broad sense) and the drive period are provided within one horizontal scan period.

In the precharge period, the multiplex control signals R1SEL, G1SEL, B1SEL, R2SEL, G2SEL, and B2SEL from the source driver 30 are simultaneously set at the H level, whereby the demultiplexer DMUX1 electrically connects the source lines R1, G1, B1, R2, G2, B2 with the source output SO1. The output circuit $OP_1$ of the source driver 30 outputs the precharge voltage PV to the source output SO1, whereby the source lines R1, G1, B1, R2, G2, and B2 are simultaneously set at the precharge voltage PV in the precharge period.

In the drive period after the precharge period, the demultiplexer DMUX1 electrically connects the source output SO1 with the source lines R1, G1, B1, R2, G2, and B2 one by one. In this case, the multiplexed grayscale voltage is also supplied to the source output SO1. Specifically, the multiplex control signals R1SEL, G1SEL, B1SEL, R2SEL, G2SEL, and B2SEL are sequentially set at the H level in the drive period, and the voltage of the source output SO1 in the period in which each multiplex control signal is set at the H level at the period is supplied to the source line by the demultiplexer DMUX1.

As is clear from FIG. 11, the effective value of the voltage applied to the pixel connected with the source line B2 among the source lines R1, G1, B1, R2, G2, and B2 is affected to a large extent by a change in the precharge voltage PV. Specifically, the pixel connected with the source line B2 is affected to the largest extent by an error in the precharge voltage PV, and the pixel connected with the source line R1 is affected to the smallest extent by an error in the precharge voltage PV. According to this embodiment, even if the effect of multiplex driving differs in dot units, deterioration in image quality can be uniformly prevented by equalizing the precharge voltage, whereby the effect of the error of the precharge voltage PV can be minimized.

According to this embodiment, the precharge voltage can be accurately supplied to the source output by controlling the output circuit as follows in addition to controlling the load of the precharge line PRL.

Figure 12:
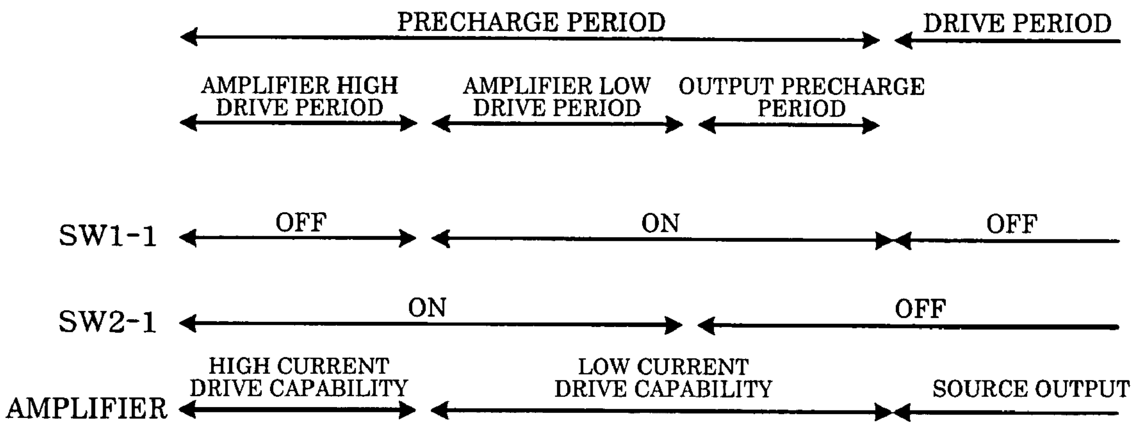
FIG. 12 is a view illustrative of a control example of an output circuit shown in FIG. 10.

FIG. 12 is a view illustrative of a control example of the output circuit $OP_1$ shown in FIG. 10.

Although FIG. 12 shows a control example of the output circuit $OP_1$, other output circuits can be controlled in the same manner as the output circuit $OP_1$.

The precharge period shown in FIG. 11 may include an amplifier high drive period, an amplifier low drive period, and an output precharge period. In the amplifier high drive period in the precharge period, the operational amplifier AMP1 drives the output of the output circuit $OP_1$ by a given first current drive capability in a state in which the first switching element SW1-1 is turned OFF and the second switching element SW2-1 is turned ON. This enables the voltage of the source output SO1 to be promptly set at the precharge voltage PV.

In the amplifier low drive period in the precharge period, the operational amplifier AMP1 drives the output of the output circuit $OP_1$ by a second current drive capability lower than the first current drive capability in a state in which the first switching element SW1-1 is turned ON and the second switching element SW2-1 is turned ON. This enables the output of the output circuit $OP_1$ to be promptly set at the precharge voltage PV. The operational amplifier AMP1 includes driver transistors having different drive capabilities in the output stage, and can drive the output using one of the driver transistors.

The first switching element SW1-1 is turned ON and the second switching element SW2-1 is turned OFF in the output precharge period. Since the voltage of the source output SO1 becomes lower to some extent than the precharge voltage PV due to the on-resistance of the first switching element SW1-1, the voltage of the source output SO1 can be accurately set at the precharge voltage PV by causing the operational amplifier AMP1 to supply a charge to its output by the second current drive capability. An increase in current consumption can be suppressed by reducing the second current drive capability.

In the drive period after the precharge period, the operational amplifier AMP1 drives the output of the output circuit $OP_1$ based on the grayscale voltage in a state in which the first switching element SW1-1 is turned OFF and the second switching element SW2-1 is turned OFF.

A control circuit (not shown) provided in the source driver 30 generates control signals for switch-controlling the first and second switching elements SW1-1 and SW2-1.

This embodiment has been described taking the source driver 30 which performs 6-multiplex drive as an example. Note that the invention is not limited to the multiplex drive number. The source driver 30 may be a non-multiplex drive source driver.

This embodiment has been described taking the case of supplying the precharge voltage to the precharge line as an example. Note that the invention is not limited to the precharge voltage.

For example, a voltage supply line may be provided instead of the precharge line, and a voltage supply point may be provided on the voltage supply line as shown in FIG. 7. The voltage of the source lines after short-circuiting the source lines of the LCD panel 20 may be applied to the voltage supply point, and each output circuit of the source driver may drive the source lines based on the grayscale data in a state in which the source lines are set at the voltage of the source lines after short-circuiting the source lines. Since the source lines can be driven in the drive period by recycling a charge stored in the source lines before driving the source lines, an unnecessary charge need not be supplied from the outside, whereby power consumption can be reduced while achieving the above-described effects of this embodiment.

Alternatively, a voltage supply point may be provided as shown in FIG. 7 on a voltage supply line provided instead of the precharge line. The voltage of the source lines after short-circuiting the source lines and the common electrode of the LCD panel 20 may be applied to the voltage supply point, and each output circuit of the source driver may drive the source lines based on the grayscale data in a state in which the source lines are set at the voltage after short-circuiting the source lines and the common electrode. The common electrode is opposite to the pixel electrode connected with the source line via the TFT (switching element) through the electro-optical substance. In this case, since the source lines can be driven in the drive period by recycling a charge stored in the source lines and the common electrode, an unnecessary charge need not be supplied from the outside, whereby power consumption can be reduced while achieving the above-described effects of this embodiment. In particular, power consumption can be significantly reduced when performing polarity inversion drive.

4. Modification 4.1 First Modification

The source driver 30 according to this embodiment includes one precharge line. Note that the source driver 30 may include two or more precharge lines.

Figure 13:
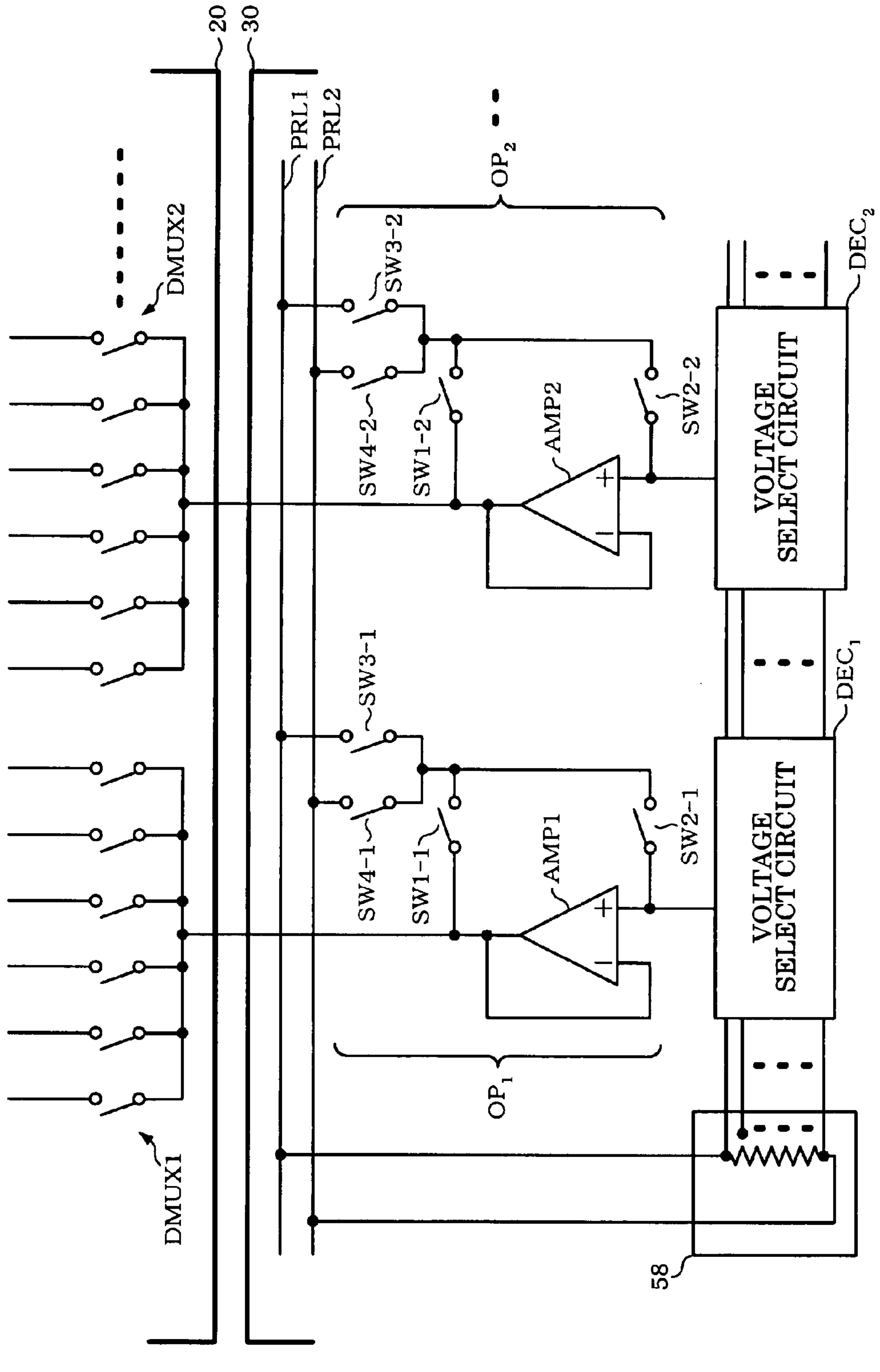
FIG. 13 is a view showing the main portion of the configuration of a source driver according to a first modification of one embodiment of the invention.

FIG. 13 shows the main portion of the configuration of a source driver according to a first modification of this embodiment. In FIG. 13, the same sections as in FIG. 10 are indicated by the same symbols. Description of these sections is appropriately omitted. In the first modification, the source driver 30 includes first and second precharge lines PRL1 and PRL2. A first precharge voltage is supplied to the first precharge line PRL1, and a second precharge voltage is supplied to the second precharge line PRL2. The voltage of one of the precharge lines is supplied to each output circuit.

Specifically, a voltage at the highest potential output from each output circuit to the source line is supplied to a voltage supply point of the first precharge line PRL1 provided so that the load from the voltage supply point to the edge EDp of the pth source output block equals the load from the voltage supply point to the edge ED(p+1) of the (p+1)th source output block. The voltage at the highest potential is the voltage at the highest potential among the grayscale voltages generated by the grayscale voltage generation circuit 58. When the grayscale voltage generation circuit 58 generates the grayscale voltages by dividing the voltage between the high-potential-side power supply voltage VDDH and the low-potential-side power supply voltage VSSH using resistors, the voltage VDDH is supplied to the first precharge line PRL1 as the first precharge voltage.

A voltage at the lowest potential output from each output circuit to the source line is supplied to a voltage supply point of the second precharge line PRL2 provided so that the load from the voltage supply point to the edge EDp of the pth source output block equals the load from the voltage supply point to the edge ED(p+1) of the (p+1)th source output block. The voltage at the lowest potential is the voltage at the lowest potential among the grayscale voltages generated by the grayscale voltage generation circuit 58. When the grayscale voltage generation circuit 58 generates the grayscale voltages by dividing the voltage between the high-potential-side power supply voltage VDDH and the low-potential-side power supply voltage VSSH using resistors, the voltage VSSH is supplied to the second precharge line PRL1 as the second precharge voltage.

Therefore, the output circuit $OP_1$ may include third and fourth switching elements SW3-1 and SW4-1. The third switching element SW3-1 supplies the voltage of the precharge line PRL1 to the operational amplifier AMP1 as the precharge voltage. The fourth switching element SW4-1 supplies the voltage of the precharge line PRL2 to the operational amplifier AMP1 as the precharge voltage. The control circuit (not shown) provided in the source driver 30 generates control signals for switch-controlling the third and fourth switching elements SW3-1 and SW4-1.

In the first modification, each output circuit of the first and second driver blocks DB1 and DB2 simultaneously supplies the first or second precharge voltage to the source lines of the LCD panel 20, and then drives the source lines by time division based on the multiplexed grayscale data in which the grayscale data of each dot of the pixels is multiplexed. For example, unnecessary precharging need not be performed by causing the precharge voltage to differ between the positive period and the negative period during polarity inversion drive, whereby a reduction in power consumption and an increase in speed in the drive period can be achieved in combination.

4.2 Second modification

In this embodiment or the first modification, the demultiplexer is provided in the LCD panel. Note that the invention is not limited thereto.

Figure 14:
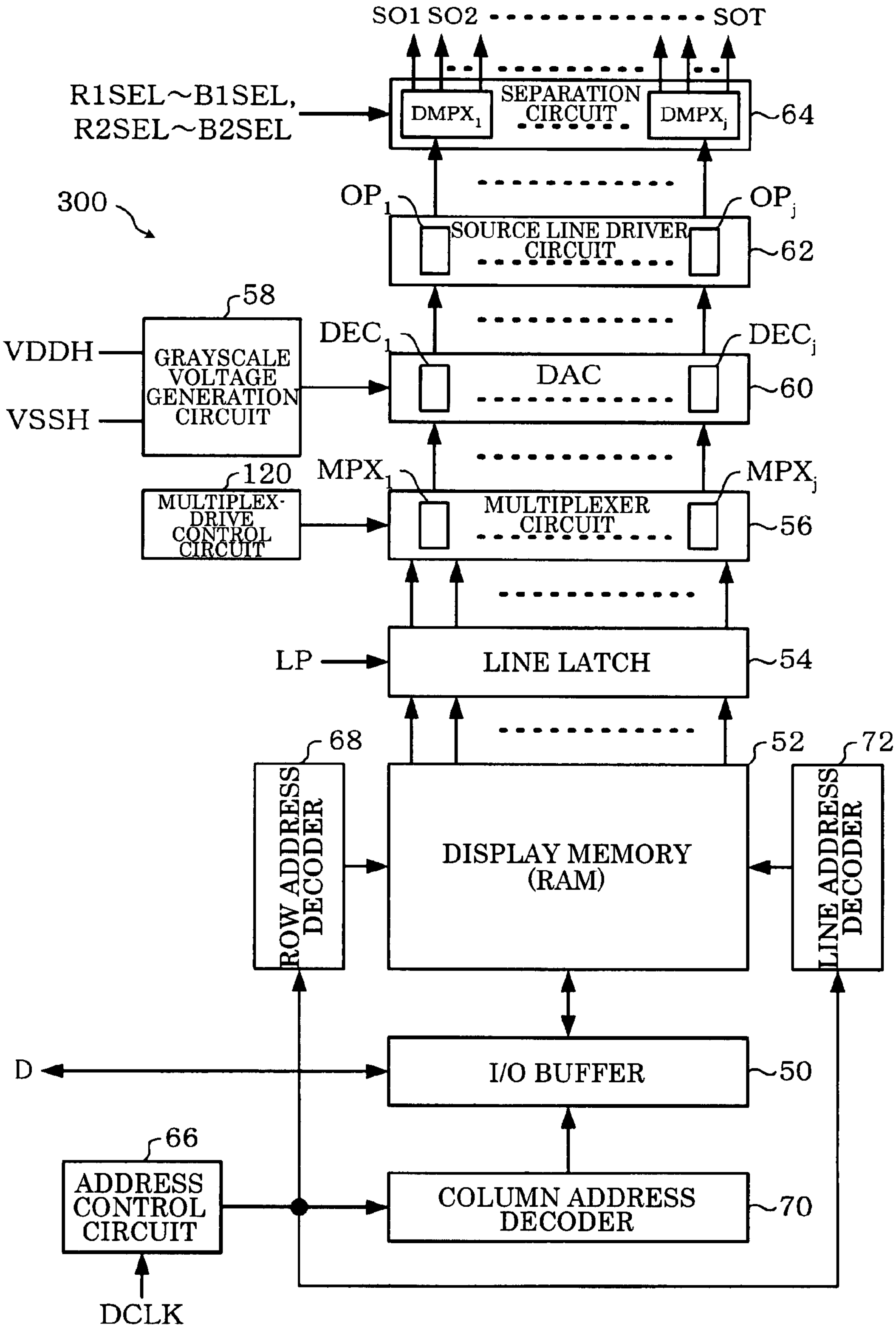
FIG. 14 is a block diagram showing a configuration example of a source driver according to a second modification of one embodiment of the invention.

FIG. 14 is a block diagram showing a configuration example of a source driver according to a second modification of this embodiment.

In FIG. 14, the same sections as in FIG. 5 are indicated by the same symbols. Description of these sections is appropriately omitted.

A source driver 300 according to the second modification differs from the source driver shown in FIG. 5 in that a separation circuit 64 is provided on the output side of the source line driver circuit 62. The separation circuit 64 includes demultiplexers DMUX1 to DMUXj. Each demultiplexer performs an operation reverse of that of the multiplexer of the multiplexer circuit 56 corresponding to each demultiplexer. Specifically, each demultiplexer separates the multiplexed grayscale voltage from each output circuit of the source line driver circuit 62 and outputs the separated multiplexed grayscale voltages to six (=k) source lines. The separation timing of the demultiplexer is synchronized with the time division timing of each multiplexer of the multiplexer circuit 56. This enables the source driver 300 to drive T (T is an integer equal to or larger than two) source lines of the LCD panel.

In this case, the LCD panel 20 can be configured so that the demultiplexers DMUX1 to DMUXj shown in FIG. 1 or 3 are omitted, an amorphous silicon liquid crystal panel which allows only a TFT with a low drive capability to be formed as the switching element but can be produced at low cost can be used as the LCD panel 20.

5. Electronic Instrument

Figure 15:
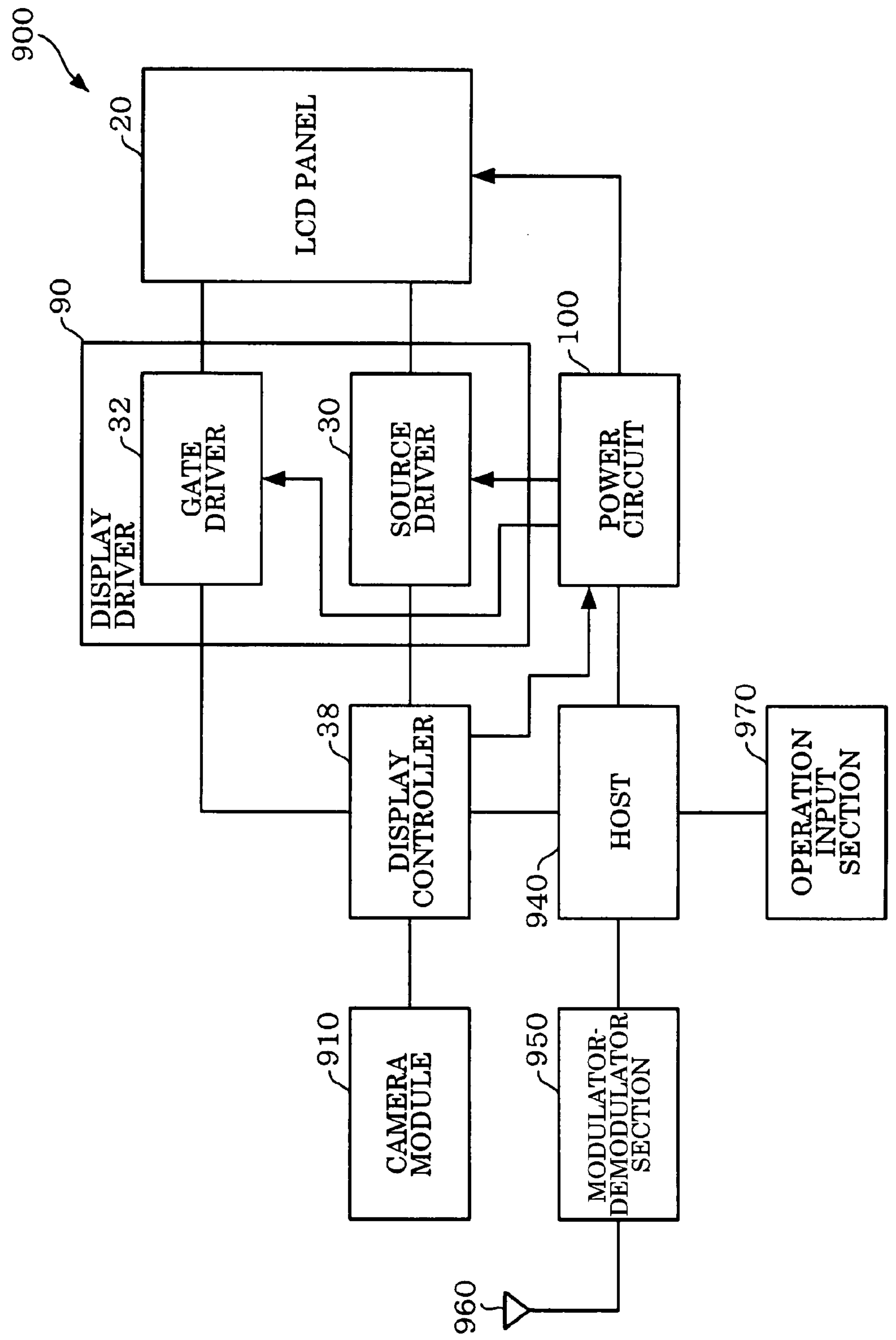
FIG. 15 is a block diagram showing a configuration example of an electronic instrument according to one embodiment of the invention.

FIG. 15 is a block diagram showing a configuration example of an electronic instrument according to this embodiment. FIG. 15 is a block diagram showing a configuration example of a portable telephone as the electronic instrument. In FIG. 15, the same sections as in FIG. 1 or 3 are indicated by the same symbols. Description of these sections is appropriately omitted.

A portable telephone 900 includes a camera module 910. The camera module 910 includes a CCD camera, and supplies data of an image captured using the CCD camera to the display controller 38 in a YUV format.

The portable telephone 900 includes the LCD panel 20. The LCD panel 20 is driven by the source driver 30 (or the source driver 300; hereinafter the same) and the gate driver 32. The LCD panel 20 includes gate lines, source lines, and pixels.

The display controller 38 is connected with the source driver 30 and the gate driver 32, and supplies grayscale data in an RGB format to the source driver 30.

The power supply circuit 100 is connected with the source driver 30 and the gate driver 32, and supplies drive power supply voltages to the source driver 30 and the gate driver 32. The power supply circuit 100 supplies the common electrode voltage Vcom to the common electrode of the LCD panel 20.

A host 940 is connected with the display controller 38. The host 940 controls the display controller 38. The host 940 demodulates grayscale data received through an antenna 960 using a modulator-demodulator section 950, and supplies the demodulated grayscale data to the display controller 38. The display controller 38 causes the source driver 30 and the gate driver 32 to display an image on the LCD panel 20 based on the grayscale data.

The host 940 modulates grayscale data generated by the camera module 910 using the modulator-demodulator section 950, and directs transmission of the modulated data to another communication device via the antenna 960.

The host 940 transmits and receives grayscale data, captures an image using the camera module 910, and displays an image on the LCD panel 20 based on operation information from an operation input section 970.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention. For example, the invention may be applied not only to drive the above liquid crystal display panel, but also to drive an electroluminescent display device, a plasma display device, and the like.

Some of the requirements of any claim of the invention may be omitted from a dependent claim which depends on that claim. Some of the requirements of any independent claim of the invention may be allowed to depend on any other independent claim.

What is claimed is:

1. A source driver that drives a plurality of source lines of an electro-optical device, the source driver comprising:

a first driver block including first to pth (p is an integer equal to or larger than two) source output blocks arranged along a horizontal direction that is perpendicular to the plurality of source lines, at least two source output blocks of the first to pth source output blocks including a first output circuit that drives at least one source line of the plurality of source lines;

a second driver block including (p+1)th to qth (p+1<q, q is an integer) source output blocks arranged along the horizontal direction, at least two source output blocks of the (p+1)th to qth source output blocks including a second output circuit that drives at least one source line of the plurality of source lines; and a precharge line that supplies a precharge voltage for precharging each of a first output of the first output circuit and a second output of the second output circuit;

the precharge voltage being supplied to a voltage supply point of the precharge line provided so that a load from the voltage supply point to an edge of the pth source output block is substantially equal to a load from the voltage supply point to an edge of the (p+1)th source output block, the precharge line including a first line and a second line, the first line of the precharge line being disposed along the horizontal direction, the second line of the precharge line being disposed along a second direction in an area between the first driver block and the second driver block, the second direction being perpendicular to the horizontal direction, the voltage supply point of the precharge line being a cross point of the first line and the second line, the first line including a third line and a fourth line, the third line being disposed from the cross point and extending in a third direction, the fourth line being disposed from the cross point and extending in a fourth direction that is a direction opposite to the third direction, the precharge voltage being supplied from the second line to the third line and the fourth line of the first line through the voltage supply point, and the precharge voltage being supplied from the third line to the first output of the first output circuit of the first driver block and being applied from the fourth line to the second output of the second output circuit of the second driver block.

2. The source driver as defined in claim 1, each of the first and second output circuits including:

an operational amplifier that drives the at least one source line of the plurality of source lines based on a grayscale voltage corresponding to grayscale data;

a first switching element inserted between the precharge line and an output of the operational amplifier; and a second switching element inserted between the precharge line and an input of the operational amplifier, in a precharge period, the operational amplifier driving each of the first and second outputs by a first current drive capability in a state in which the first switching element is turned OFF and the second switching element is turned ON, the operational amplifier then driving each of the first and second outputs by a second current drive capability lower than the first current drive capability in a state in which the first switching element is turned ON and the second switching element is turned ON, and then the first switching element being turned ON and the second switching element being turned OFF, and in a drive period after the precharge period, the operational amplifier driving each of the first and second outputs based on the grayscale voltage in a state in which the first switching element is turned OFF and the second switching element is turned OFF.

3. The source driver as defined in claim 1, a multiplexed voltage obtained by multiplexing grayscale voltages of one horizontal scan period by time division being input to an input of an operational amplifier of each of the first and second output circuits, and each of the source output blocks including a demultiplexer for separating the output from the operational amplifier into the plurality of source lines in synchronization with a time division timing of the multiplexed voltage.

4. An electro-optical device comprising:
a plurality of gate lines;
the plurality of source lines;
a plurality of pixels, each of the plurality of pixels being specified by a gate line among the plurality of gate lines and a source line among the plurality of source lines;
a gate driver that scans the plurality of gate lines; and
the source driver as defined in claim 1 that drives the plurality of source lines.

5. An electro-optical device comprising:
a plurality of gate lines;
the plurality of source lines;
a plurality of pixels, each of the plurality of pixels being specified by a gate line among the plurality of gate lines and a source line among the plurality of source lines;
a gate driver that scans the plurality of gate lines;
the source driver as defined in claim 1 that drives the plurality of source lines; and
a demultiplexer that separates one output of the source driver into source lines among the source lines.

6. An electro-optical device comprising the source driver as defined in claim 1.

7. An electronic instrument comprising the electro-optical device as defined in claim 4.

8. An electronic instrument comprising the electro-optical device as defined in claim 6.

9. An electronic instrument comprising the source driver as defined in claim 1.

10. The source driver as defined in claim 1, further comprising:
a logic section used in common by the first driver block and the second driver block,
the logic section being disposed in the area between the first driver block and the second driver block, and
the second line of the precharge line being disposed in the area of the logic section along the second direction.

11. A source driver that drives a plurality of source lines of an electro-optical device, the source driver comprising:
a first driver block including first to pth (p is an integer equal to or larger than two) source output blocks arranged along a horizontal direction that is perpendicular to the plurality of source lines, at least two source output blocks of the first to pth source output blocks including a first output circuit that drives at least one source line of the plurality of source lines;
a second driver block including (p+1)th to qth (p+1<q, q is an integer) source output blocks arranged along the horizontal direction, at least two source output blocks of the (p+1)th to qth source output blocks including a second output circuit that drives at least one source line of the plurality of source lines; and
a voltage supply line that supplies a given voltage to each of a first output of the first output circuit and a second output of the second output circuit,
the given voltage being supplied to a voltage supply point of the voltage supply line provided so that a load from the voltage supply point to an edge of the pth source output block is substantially equal to a load from the voltage supply point to an edge of the (p+1)th source output block,
after the given voltage has been supplied to the plurality of source lines, each of the first and second output circuits driving the plurality of source lines by time division based on multiplexed grayscale data, each pixel of pixels of the electro-optical device having a plurality of dots, grayscale data of each dot of the pixels being multiplexed in the multiplexed grayscale data,
the voltage supply line including a first line and a second line,
the first line of the voltage supply line being disposed along the horizontal direction, the second line of the voltage supply line being disposed along a second direction in an area between the first driver block and the second driver block, the second direction being perpendicular to the horizontal direction,
the voltage supply point of the voltage supply line being a cross point of the first line and the second line,
the first line including a third line and a fourth line,
the third line being disposed from the cross point and extending in a third direction,
the fourth line being disposed from the cross point and extending in a fourth direction that is a direction opposite to the third direction,
the given voltage being supplied from the second line to the third line and the fourth line of the first line through the voltage supply point, and
the given voltage being supplied from the third line to the first output of the first output circuit of the first driver block and being supplied from the fourth line to the second output of the second output circuit of the second driver block.

12. The source driver as defined in claim 11, the given voltage being a precharge voltage.

13. The source driver as defined in claim 12, each of the first and second output circuits including:
an operational amplifier that drives the at least one source line of the plurality of source lines based on a grayscale voltage corresponding to grayscale data;
a first switching element inserted between the voltage supply line and an output of the operational amplifier; and
a second switching element inserted between the voltage supply line and an input of the operational amplifier,
in a voltage setting period, the operational amplifier driving each of the first and second outputs by a first current drive capability in a state in which the first switching element is turned OFF and the second switching element is turned ON, the operational amplifier then driving each of the first and second outputs by a second current drive capability lower than the first current drive capability in a state in which the first switching element is turned ON and the second switching element is turned ON, and then the first switching element being turned ON and the second switching element being turned OFF, and
in a drive period after the voltage setting period, the operational amplifier driving each of the first and second outputs based on the grayscale voltage in a state in which the first switching element is turned OFF and the second switching element is turned OFF.

14. The source driver as defined in claim 11,
the given voltage being a first voltage of the plurality of source lines of the electro-optical device after short-circuiting the plurality of source lines, and
each of the first and second output circuits driving the plurality of source lines based on the grayscale data in a state in which the plurality of source lines are set at the first voltage after short-circuiting the plurality of source lines.

15. The source driver as defined in claim 11,
the given voltage being a second voltage of the plurality of source lines of the electro-optical device after short-circuiting the plurality of source lines and a common electrode opposite to pixel electrodes connected with the plurality of source lines via switching elements through an electro-optical substance, and each of the first and second output circuits driving each of the plurality of source lines based on the grayscale data in a state in which the plurality of source lines are set at the second voltage after short-circuiting the plurality of source lines and the common electrode.

16. The source driver as defined in claim 11, a multiplexed voltage obtained by multiplexing grayscale voltages of one horizontal scan period by time division being input to an input of an operational amplifier of each of the first and second output circuits, and each of the source output blocks including a demultiplexer for separating the output from the operational amplifier into the plurality of source lines in synchronization with a time division timing of the multiplexed voltage.

17. An electronic instrument comprising the source driver as defined in claim 11.

18. The source driver as defined in claim 11, further comprising:

a logic section used in common by the first driver block and the second driver block, the logic section being disposed in the area between the first driver block and the second driver block, and the second line of the voltage supply line being disposed in the area of the logic section along the second direction.

19. A source driver that drives a plurality of source lines of an electro-optical device, the source driver comprising:

a first driver block including first to pth (p is an integer equal to or larger than two) source output blocks arranged along a first direction, at least two source output blocks of the first to pth source output blocks including a first output circuit that drives at least one source line of the plurality of source lines;

a second driver block including (p+1)th to qth (p+1<q, q is an integer) source output blocks arranged along the first direction, at least two source output blocks of the (p+1) th to q th source output blocks including a second output circuit that drives at least one source line of the plurality of source lines;

a first precharge line supplying a first precharge voltage for precharging each of a first output of the first output circuit and a second output of the second output circuit; and a second precharge line supplying a second precharge voltage for precharging each of the first output of the first output circuit and the second output of the second output circuit, each of the first and second output circuits of the first and second driver blocks simultaneously supplying one of the first and second precharge voltages to the plurality of source lines, and then driving each of the plurality of source lines by time division based on multiplexed grayscale data, each pixel of pixels of the electro-optical device having a plurality of dots, grayscale data of each dot of the pixels being multiplexed in the multiplexed grayscale data, a first voltage at a highest potential output to the plurality of source lines from each of the first and second output circuits being supplied as the first precharge voltage to a voltage supply point of the first precharge line provided so that a load from the voltage supply point to an edge of the pth source output block is substantially equal to a load from the voltage supply point to an edge of the (p+1)th source output block, and a second voltage at a lowest potential output to the plurality of source lines from each of the first and second output circuits being supplied as the second precharge voltage to a voltage supply point of the second precharge line provided so that a load from the voltage supply point to an edge of the pth source output block is substantially equal to a load from the voltage supply point to an edge of the (p+1)th source output block, the potential of the first voltage being higher than the potential of the second voltage.

20. The source driver as defined in claim 19, each of the first and second output circuits including:

an operational amplifier that drives the at least one source line of the plurality of source lines based on a grayscale voltage corresponding to the grayscale data;

a first switching element inserted between the first or second precharge line and an output of the operational amplifier; and a second switching element inserted between the first or second precharge line and an input of the operational amplifier, in a precharge period, the operational amplifier driving each of the first and second outputs by a first current drive capability in a state in which the first switching element is turned OFF and the second switching element is turned ON, the operational amplifier then driving each of the first and second outputs by a second current drive capability lower than the first current drive capability in a state in which the first switching element is turned ON and the second switching element is turned ON, and then the first switching element being turned ON and the second switching element being turned OFF, and in a drive period after the precharge period, the operational amplifier driving each of the first and second outputs based on the grayscale voltage in a state in which the first switching element is turned OFF and the second switching element is turned OFF.

21. The source driver as defined in claim 19, a multiplexed voltage obtained by multiplexing grayscale voltages of one horizontal scan period by time division being input to an input of an operational amplifier of each of the first and second output circuits, and each of the source output blocks including a demultiplexer for separating the output from the operational amplifier into the plurality of source lines in synchronization with a time division timing of the multiplexed voltage.

22. An electronic instrument comprising the source driver as defined in claim 19.

* * * * *